(12) United States Patent
Nicholson et al.

(10) Patent No.: US 11,324,227 B2
(45) Date of Patent: May 10, 2022

(54) FOOD PACKAGING FILM AND MANUFACTURING METHOD FOR MAKING THE SAME

(71) Applicant: Viskase Companies, Inc., Lombard, IL (US)

(72) Inventors: Myron D. Nicholson, Lombard, IL (US); Dmytro Shoshyn, Lombard, IL (US)

(73) Assignee: VISKASE COMPANIES, INC., Lombard, IL (US)

( * ) Notice: Subject to any disclaimer, the term of this patent is extended or adjusted under 35 U.S.C. 154(b) by 440 days.

(21) Appl. No.: 16/081,700

(22) PCT Filed: Feb. 9, 2017

(86) PCT No.: PCT/EP2017/052919
§ 371 (c)(1),
(2) Date: Aug. 31, 2018

(87) PCT Pub. No.: WO2017/148682
PCT Pub. Date: Sep. 8, 2017

(65) Prior Publication Data
US 2020/0281218 A1   Sep. 10, 2020

Related U.S. Application Data

(60) Provisional application No. 62/367,370, filed on Jul. 27, 2016, provisional application No. 62/358,500, (Continued)

(51) Int. Cl.
*B65D 65/40* (2006.01)
*B32B 27/32* (2006.01)
(Continued)

(52) U.S. Cl.
CPC .............. *A22C 13/00* (2013.01); *A23B 4/048* (2013.01); *B32B 1/08* (2013.01); *B32B 5/18* (2013.01); *B32B 5/32* (2013.01); *B32B 7/12* (2013.01); *B32B 27/065* (2013.01); *B32B 27/08* (2013.01); *B32B 27/18* (2013.01); *B32B 27/34* (2013.01);
(Continued)

(58) Field of Classification Search
CPC ................ B32B 5/18; B32B 2307/736; B32B 2307/7246; B32B 2307/7244; B32B 2307/72; B32B 2307/54; B32B 2307/4026; B32B 2266/025; B32B 2250/05;
(Continued)

(56) References Cited

U.S. PATENT DOCUMENTS

| 6,589,615 B1* | 7/2003 | Yen ..................... A22C 13/0006 428/34.8 |
| 2002/0192405 A1* | 12/2002 | Schwartz ................ B32B 27/32 428/34.2 |
| 2011/0278311 A1* | 11/2011 | Chiquet .................... B32B 7/12 220/660 |

* cited by examiner

Primary Examiner — Ellen S Hock
(74) Attorney, Agent, or Firm — Edward E. Sowers; Brannon Sowers & Cracraft PC

(57) ABSTRACT

The present invention relates to a multilayer film, especially to a multilayer thermoplastic film, which may be used for food packaging, wherein the multilayer film according to the present invention may be provided, on its inner side, with a food additive, particularly with a flavoring and/or coloring and/or an aroma producing food additive (such as e.g. a liquid smoke), which food additive is then released and transferred onto the surface of a foodstuff encased in the multilayer film during cooking and/or processing of the foodstuff.

22 Claims, 6 Drawing Sheets

Related U.S. Application Data filed on Jul. 5, 2016, provisional application No. 62/302,545, filed on Mar. 2, 2016.

(51) Int. Cl.
| | |
|---|---|
| *A22C 13/00* | (2006.01) |
| *A23B 4/048* | (2006.01) |
| *B32B 1/08* | (2006.01) |
| *B32B 5/18* | (2006.01) |
| *B32B 5/32* | (2006.01) |
| *B32B 7/12* | (2006.01) |
| *B32B 27/06* | (2006.01) |
| *B32B 27/08* | (2006.01) |
| *B32B 27/18* | (2006.01) |
| *B32B 27/34* | (2006.01) |

(52) U.S. Cl.
CPC .......................... *A22C 2013/002* (2013.01); *A22C 2013/0046* (2013.01); *A22C 2013/0053* (2013.01); *A22C 2013/0059* (2013.01); *A22C 2013/0089* (2013.01); *A23V 2002/00* (2013.01); *B32B 2250/05* (2013.01); *B32B 2250/24* (2013.01); *B32B 2266/025* (2013.01); *B32B 2266/06* (2013.01); *B32B 2307/4026* (2013.01); *B32B 2307/54* (2013.01); *B32B 2307/72* (2013.01); *B32B 2307/7244* (2013.01); *B32B 2307/7246* (2013.01); *B32B 2307/736* (2013.01); *B32B 2439/70* (2013.01)

(58) Field of Classification Search
CPC ......... B32B 27/34; B32B 27/18; B32B 27/08; B32B 27/065; B32B 7/12; B32B 5/32
See application file for complete search history.

FOOD PACKAGING FILM AND MANUFACTURING METHOD FOR MAKING THE SAME

CROSS-REFERENCES TO RELATED APPLICATIONS

This application is a National Stage filing of International Application PCT/EP 2017/052919, filed Feb. 9, 2017, entitled "FOOD PACKAGING FILM AND MANUFACTURING METHOD FOR MAKING THE SAME" claiming priority to U.S. Provisional Patent Application No. 62/302,545 filed Mar. 2, 2016, U.S. Provisional Patent Application No. 62/358,500 filed Jul. 5, 2016, and U.S. Provisional Patent Application No. 62/367,370 filed Jul. 27, 2016. The subject application claims priority to PCT/EP 2017/052919, to U.S. Provisional Patent Application No. 62/302,545, to U.S. Provisional Patent Application No. 62/358,500, and to U.S. Provisional Patent Application No. 62/367,370, and incorporates all by reference herein, in their entirety.

FIELD OF THE INVENTION

The present invention relates to the technical field of food packaging films and particularly to the treatment of foodstuffs packaged or encased therein, especially with the aim of releasing or transferring food additives (particularly those providing flavoring and/or coloring and/or an aroma, such as liquid smoke or other food additives) to the surface of the packaged or encased foodstuff, which food additives have been previously provided to the food packaging films.

Especially, the present invention relates to a multilayer film, especially to a multilayer thermoplastic film, particularly to be used for food packaging, and to a method of manufacturing such multilayer film as well as to the use of such multilayer film, especially its use for releasing and/or transferring at least one food additive onto a surface of a foodstuff.

Furthermore, the present invention relates to a food packaging film capable of releasing and/or transferring at least one food additive onto a surface of a foodstuff encased therein and to a method of manufacturing such food packing film as well as to the use of such food packing film, especially its use for releasing and/or transferring at least one food additive onto a surface of a foodstuff.

Further, the present invention also refers to an encased foodstuff, especially a heat processed fat and/or protein containing foodstuff, preferably a meat containing foodstuff, which foodstuff is encased in a food packaging film of the present invention.

Moreover, the present invention also refers to a method for releasing and/or transferring at least one food additive onto a foodstuff surface and/or for providing a foodstuff surface with at least one food additive.

BACKGROUND OF THE INVENTION

Films, especially plastic films, particularly tubular films, are often used as sausage casings for processing and packaging sausages, including water or steam cooked sausages. Casings are also used to process and package larger products, such as various types of deli cuts of meats made from chicken, beef and ham.

One particularly typical casing is made from regenerated cellulose, wherein viscose may be extruded through an annular die into a coagulating and regenerating bath to produce a tube of regenerated cellulose; this is well known in the art. Usually, such tubes made from regenerated cellulose are subsequently washed, plasticized and may be impregnated with a water-soluble casing-permeable food flavorant or colorant, and then dried while inflated under substantial air pressure. After drying, this cellulosic non-fibrous casing is wound on reels and subsequently pleated or shirred, especially on high speed shirring machines.

Non-fibrous casings are typically used to process small diameter sausages including Polish sausages, wieners or frankfurters and are generally removed from the sausages after processing.

Non-fibrous cellulose casings may be reinforced by applying the viscose to a substrate such as paper or fabric, increasing the strength of the casing, which is a feature desired when producing the large-sized deli products.

Food additives (especially food colorants and/or flavorants and/or those that impart an aroma to food) as well as a variety of processing and peeling aids may be introduced into the interior of the casing during the manufacturing process. In tubular casings, these additives are generally introduced by slugging or spraying while flat films may have these additives applied to their ultimate inner food contacting surface by methods such as blade coating or printing, e.g. using a rotogravure method.

Food additives, especially food colorants and/or flavorants and/or those that provide an aroma, are used to color and/or flavor and/or scent the foodstuff processed within. These additives can be found as formulations of aqueous solutions, dispersions, and oil-based emulsions, among others. References to "food additives" in this application include all such formulations. In particular, production of smoked or browned sausages or meats has been accomplished through the use of casings containing liquid smoke or caramel, which transfers to the surface of the encased meat product during processing.

Historically, food colorants and flavorants have been applied to various foodstuffs, such as sausage and cheese surfaces, by various means. For example, sausages have been colored and/or flavored by smoking with gaseous or liquid wood smoke or by dipping peeled sausages into a vat containing a colorant or by spraying or dipping encased sausages with a casing-permeable liquid dye and/or flavorant or by stuffing sausage meat into casings having their interior surfaces coated with transferable food colorants and/or flavorants.

Other types of casings are made from thermoplastic films or tubes and may either be monolayered or multilayered. Thermoplastic films and casings are advantageous over cellulosic casing primarily for ease of production and lower costs to produce them. Production generally involves the melting of a resin and extruding it, usually through an appropriate die, to form a particular shape, and then heating, cooling and optionally stretching or orienting it during its formation into a film or a tube. No equipment is needed to handle wood pulp and to dissolve and regenerate it, as in the manufacture of cellulose casings.

A particularly commonly used thermoplastic casing is a tubular polyamide monolayer. Others are laminated films produced by placing layers of various materials, such as polyamides (nylons, PA), polyolefins such as polyethylenes (PE) or polypropylenes (PP), ethylene vinyl acetates (EVA), ethylene vinyl alcohols (EVOH), polyvinylidene chloride copolymers (PVDC) and blends or copolymers or for polymers thereof, to name only a few, directly or indirectly adjacent to each other, with or without the use of adhesives, in order to produce films of various desired properties.

In one typical method of manufacture, flat films are made and strips of desired widths are cut and formed into tubes and sealed closed by various methods, such as by overlapping the ends of the tube and sealing them together using adhesives, or by applying a tape to the edges and sealing it with adhesives, or by welding the tape over the abutted edges with heat. Thermoplastic films are also produced by extruding the molten resin from an annular die and optionally stretching the tube e.g. by expanding it with air. Multiple layers may be made by coextruding multiple layers together. Multilayered thermoplastic films also can be made by extrusion lamination, wherein the thermoplastic layer is extruded through a slot die directly onto an adhesive layer already placed onto a non-adhesive layer or onto other plastic layers.

An important requirement as to laminated films is that they should not delaminate upon handling, cooking, and particularly when being peeled off from encased cooked products. It is extremely disadvantageous to have a layer of film partially or completely left on the skin of a cooked sausage since such product would be considered unsuitable for consumption. Also, these films should maintain high strength and low elongation properties. They should be sealable and the seal should withstand processing conditions.

Additional features needed for films that provide flavors and/or colors to the encased food include the ability of these films to absorb on their food contact inner layer adequate amounts of flavoring and/or coloring material, such as liquid smoke or caramel, and then to transfer this flavoring and/or coloring material to an encased food product.

Certain other properties, including water (vapor) and oxygen barrier properties, are also desired in order to maintain water levels in the cooked product to minimize weight loss and to keep the product from spoiling if stored with the casing or film left on.

The prior art casings described above are usually provided to the food processor in a shirred form. Shirring is a method of pleating a long piece of flat, especially tubular casing into a much shorter tube called a stick. For example, a shirred stick of a thermoplastic small bore casing that measures about 15 inches in length can contain about 185 feet of casing. These sticks are used in automatic stuffing machines whereby the sticks are held in place and the foodstuff, in particular sausage emulsions, is introduced under high speed and pressure into the interior of the stick, simultaneously deshirring the stick and forming the sausages. Larger bore casings are used on machines encasing processed and formed meats, hams or other whole muscle meats as well as various deli-type meats. These casings are removed after cooking and the processed meats may be automatically sliced and packaged for sale to the ultimate consumer.

Generally, casings containing a food additive, especially a food flavorant and/or colorant and/or an aroma providing additive, should have an absorbent interior surface. Cellulosic casings or casings comprising a paper or fabric inner layer have the ability to absorb liquids. It has been found that these inner layers should absorb enough liquid to provide the desired effect on the encased foodstuffs.

However, thermoplastic films do not have the ability to absorb aqueous solutions to any appreciable extent but generally only from about 1 to 3 wt. %, and even when they do absorb a small amount of food colorants and/or flavorants, the amount of this solution transferred to the encased foodstuff is low and usually unevenly dispersed on the surface of the foodstuff.

European patent publication EP 0 992 194 B1 discloses a barrier wrapping for foodstuffs which are scalded, boiled or heated in another way in the wrapping, particularly for sausages, ham, pickled food or processed cheese, wherein the wrapping consists of a film which is impermeable at least to water-vapor and/or gas and has joined to it an absorbent inner lining consisting of individual fibers or a woven or knitted fabric, preferably a non-woven fabric, and wherein this inner lining is impregnated with colorings and/or flavorings. However, since the inner layer consists of individual fibers or a woven or knitted fabric, the barrier wrapping cannot be produced in a coextrusion process, i.e. the manufacture of the barrier wrapping is not very economic. In addition, the absorbent inner lining consisting of individual fibers or a woven or knitted fabric has only a limited loadability or absorption capacity as to food colorants and/or flavorants. Furthermore, during cooking and/or processing foodstuffs encased in the barrier wrapping, fibers of the inner lining may partially adhere to the foodstuff surfaces in an undesired manner.

European patent publication EP 1 559 323 B1 refers to a smokable polymeric casing made of a seamless tubular smokable biaxially stretched heat-shrinkable film comprising a blend of polyamide, a specific polyvinyl alcohol and, optionally, an antiblocking agent. This polymeric casing is itself smokable but cannot absorb food colorants and/or flavorants in a significant manner.

U.S. Pat. No. 4,377,187 refers to liquid smoke impregnated fibrous food reinforced cellulosic food casings with wood-derived liquid smoke having smoke color, odor and flavor constituents, impregnated in the casing wall. However, the loading capacity of these food casings is quite limited. In addition, the barrier properties, especially against oxygen and/or water vapor, are quite poor. Furthermore, such casings cannot be produced by a simple coextrusion method.

OBJECTS OF THE PRESENT INVENTION

What is needed in the food packaging industry is therefore a preferably thermoplastic multilayer film (e.g. in a flat or preferably tubular form), which multilayer film may be provided (e.g. absorbed onto or impregnated) with and retain food additives (solutions or emulsions of food additives) in or on its food contacting inner layer(s), which food additives may then be transferred to the surface of any encased and processed foodstuff.

Particularly, in view of the prior art described above, the problem underlying the present invention is especially to provide a preferably thermoplastic multilayer film (especially to be used as a food packaging film), particularly in the form of a flat or tubular multilayer thermoplastic film, which multilayer film should be capable of at least substantially avoiding or at least ameliorating the above-described disadvantages of the prior art.

Especially, one particular problem addressed by the present invention is that of providing a preferably thermoplastic multilayer film (preferably a flat or tubular thermoplastic multilayer food packaging film), especially to be used as a food packaging film, which has an improved efficiency with respect to its reversible absorption capacity or loadability of food additives (e.g. food colorants and/or flavorants and/or aroma producing additives).

Especially, such food packaging film must have a food contacting inner surface with a food additive (e.g. an aqueous solution of food colorants and/or flavorants and/or aroma producing additives), which food additives are then transferred to the surface of any encased foodstuff during cooking and/or processing.

SUMMARY OF THE INVENTION

The present invention, according to a first aspect of the present invention, refers to a multilayer film, especially to a thermoplastic multilayer film, particularly to be used for food packaging, as defined herein; further, particularly advantageous embodiments of this aspect of the present invention are the subject-matter of the respective claims.

Furthermore, according to a second aspect of the present invention, the present invention also relates to a thermoplastic food packing film capable of releasing and/or transferring at least one food additive onto a surface of a foodstuff encased therein, as defined herein; further, particularly advantageous embodiments of this aspect of the present invention are described.

Further, according to a third aspect of the present invention, the present invention also relates to an encased foodstuff, especially a heat processed fat and/or protein containing foodstuff, preferably a meat containing foodstuff, which foodstuff is encased in a food packaging film of the present invention; a further, particularly advantageous embodiment of this aspect of the present invention is provided.

Also, according to a fourth aspect of the present invention, the present invention also relates to the inventive use of the inventive multilayer film for releasing and/or transferring at least one food additive onto a surface of a foodstuff, as described; a further, particularly advantageous embodiment of this aspect of the present invention is provided.

Furthermore, according to a fifth aspect of the present invention, the present invention also relates to the inventive use of the food packaging film for releasing and/or transferring at least one food additive onto a surface of a foodstuff, as defined; a further, particularly advantageous embodiment of this aspect of the present invention is provided.

Further, according to a sixth aspect of the present invention, the present invention also relates to an inventive method for releasing and/or transferring at least one food additive onto a foodstuff surface and/or for providing a foodstuff surface with at least one food additive.

Moreover, according to a seventh aspect of the present invention, the present invention also relates to an inventive method for manufacturing an inventive multilayer film, as defined herein; further, particularly advantageous embodiments of this aspect of the present invention are disclosed.

Finally, according to an eighth aspect of the present invention, the present invention also relates to an inventive method for manufacturing an inventive food packaging film including further, particularly advantageous embodiments of the present invention.

Before the present invention will be described more in detail hereinafter, the following general remarks are given:

It will be appreciated and it goes without saying that, in the following, any embodiments, particularities, advantages, explanations, indications, configurations and the like that are described or cited hereinafter for just one aspect of the present invention for the purpose of avoiding repetition do, of course, also apply correspondingly and mutatis mutandis in relation to all other aspects of the present invention.

Furthermore, it will be appreciated that, in the case of any values, numbers, figures, ranges etc. indicated hereinafter, any ranges etc. stated should not be understood in a restrictive manner. It will be apparent to the person skilled in the art that, depending on the individual case and/or based on the respective application, it is possible to deviate from the stated ranges, figures, values etc., without leaving the scope of the present invention.

Moreover, any values, numbers, figures, ranges, parameters and the like indicated hereinafter may be determined or ascertained, in principle, by standardized or expressly specified determination methods or else by determination methods well known per se to those skilled in the art.

Having stated this and with these provisions, the present invention will be described more in detail hereinafter.

DETAILED DESCRIPTION OF THE INVENTION

Figure 1:
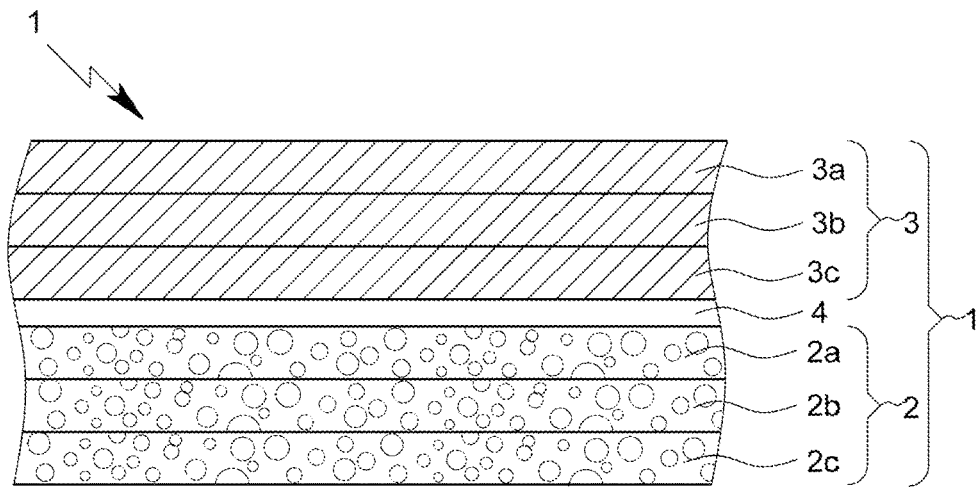
FIGS. 1, 1A, 1B show schematic cross-sectional views of various inventive multilayer films of the present invention according to particular embodiments.

According to a first aspect of the present invention, the present invention refers to a multilayer film, especially a multilayer thermoplastic film, particularly to be used for food packaging, wherein the multilayer film comprises at least three layers and/or layer composites, especially at least three polymeric layers and/or layer composites:

(A) an inner layer composite, especially an inner food contacting layer composite, wherein the inner layer composite comprises a plurality of single inner layers attached and/or adhered to one another, especially coextruded with one another, wherein the single inner layers are each composed of at least one foamed polymer comprising at least one polyolefin and wherein the single inner layers each comprise a multitude of voids, especially open cells or pores, capable of reversibly retaining and/or absorbing at least one food additive;

(B) an outer layer composite, wherein the outer layer composite comprises a plurality of single outer layers attached and/or adhered to one another, especially coextruded with one another, wherein the single outer layers each comprise at least one polyamide;

(C) an adhesive layer (tie layer) disposed between the inner layer composite and the outer layer composite, especially adhered to and/or coextruded with the inner layer composite and the outer layer composite.

The multilayer film of the present invention is linked to a multitude of advantages and particularities, some of which are described in the following in a non-limiting way:

Due to its porous structure, especially due to the presence of a multitude of voids in the inner layer composite, the multilayer film of the present invention is capable of absorbing or being loaded with large amounts of a food additive, which amounts can even exceed the own weight of the inventive multilayer film itself.

Since the voids, especially in the form of open cells and pores, are capable of absorbing and releasing (reversibly retaining) a food additive, the multilayer film of the present invention, when provided or impregnated with a food additive on its inner side, is capable of transferring or releasing the food additive onto the surface of a foodstuff encased in the multilayer film, especially during cooking and/or processing the foodstuff.

Especially, applicant has surprisingly found out that, since the inner layer composite comprises a plurality of porous single inner layers attached and/or adhered to one another, this leads to an increase in loadability or absorption capacity with respect to the food additive compared to a porous single layer of the same thickness. Without being bound to any theory, this phenomenon might be explained by the existence of capillary effects or capillary forces due to the presence of a plurality of porous single inner layers.

The plurality of single inner layers forms a complex three-dimensional porous system of voids, especially open cells or pores, which effectively absorb or retain food additive in a reversible manner (i.e. upon contact with a foodstuff surface, the food additives are released or transferred to the foodstuff surface encased in the inventive multilayer film).

In contrast to fibrous cellulosic casings or casings containing, on the inner side, textile fabrics for the absorption of food additives, the multilayer films of the present invention completely do not use any textile or fibrous material but provide porosity on the basis of a polymeric, especially thermoplastic, material. This significantly facilitates manufacturing processes since the multilayer films of the present invention can be easily produced by coextrusion. Also any potential contamination of the foodstuff surface due to fibers is completely prevented.

In this respect, it is completely surprising that a thermoplastic material allows for such a high absorption capacity or loadability with respect to food additives.

Since the inventive multilayer films can be easily produced by coextrusion techniques, seamless tubular forms of the inventive multilayer films can be easily produced, which can then be further processed to bags or pouches, especially food packaging bags or pouches.

Also, in contrast to prior art food packagings comprising textile inner materials, the multilayer films of the present invention can be easily further processed, e.g. by stretching, tentering, or orienting the coextruded films (e.g. monoaxial or biaxial stretching or orientation).

Furthermore, applicant has also surprisingly found that, due to the fact that also the outer layer composite comprises a plurality of single outer layers attached and/or adhered to one another, mechanical and physicochemical properties are improved if compared to a single outer layer of same thickness, i.e. the multilayer outer composite structure (which is composed of general single outer layers) surprisingly leads to a significant improvement of mechanical and physicochemical properties, such as tensile strength, elongation at break, puncture resistance, oxygen barrier, water vapor transmission, etc.

The porosity of the inventive multilayer film, especially of the inner layer composite, can be easily modified by stretching or orienting the multilayer film after coextrusion: Stretching or orienting the multilayer film after extrusion (e.g. monoaxial or biaxial orientation) leads to a significant enlargement of the voids, especially cells and pores. In addition, closed voids are broken up or forced open to result in an almost completely open-pore cell structure, so that almost all voids are capable of reversibly retaining and/or absorbing at least one food additive.

Due to their large porosity, especially due to the capillary system formed by the multitude of voids of the single inner layers of the inner layer composite, the multilayer films of the present invention can be easily provided, especially impregnated with the desired food additives (e.g. by spraying, slugging or the like).

Due to their excellent mechanical properties, the multilayer films of the present invention, especially in tubular form, can be easily shirred into sticks, which is a decisive advantage when used in food packaging industries, especially with respect to automatic shirring machines. Due to the high porosity and loadability with respect to food additives, there is essentially no loss of absorbed food additives during shirring of the inventive multilayer films. Thus, as can be seen from the above, the multilayer films of the present invention are linked to a great number of particularities and advantages.

According to a particular embodiment of the present invention, the inventive multilayer film is a multilayer thermoplastic food packaging film, especially a biaxially oriented multilayer thermoplastic food packaging film, preferably a coextruded biaxially oriented multilayer thermoplastic food packaging film.

According to a further particular embodiment, the multilayer film of the present invention is mono- or biaxially oriented (stretched), preferably biaxially oriented (stretched).

Furthermore, according to another particular embodiment of the present invention, the multilayer film of the present invention is flat (i.e. planar) or tubular, preferably tubular.

Especially, the multilayer film of the present invention forms and/or is a tube, especially a seamless tube.

Particularly, the multilayer film of the present invention may be a tubular film, preferably a seamless tubular film.

According to a specific embodiment of the present invention, the multilayer film of the present invention forms and/or is a casing, especially a tubular casing, preferably a seamless tubular casing.

According to a further embodiment of the present invention, the multilayer film may be shirred. This embodiment specifically applies when the multilayer film is a tube, i.e. a tubular film.

According to this specific embodiment, it is preferred that the multilayer film of the present invention forms and/or is a shirred casing, especially a shirred tubular casing, preferably a shirred seamless tubular casing.

As used herein, the term "casing(s)" may be planar or tubular films or may be in the form of pouches or bags. The tubular films may also be seamed or seamless. Any other variation of casings as practiced by those skilled in the art is included in this definition. The terms "casing(s)", on the one hand, and "film(s)", on the other hand, may especially used interchangeably and/or synonymously herein.

Usually, the multilayer film of the present invention has been coextruded and/or has been produced by coextrusion, respectively.

Particularly, the layers and/or layer composites of the inventive multilayer film are coextruded. Especially, the layers and/or layer composites of the multilayer film are adhered or attached to one another by coextrusion.

In order to be usable in the food packaging industry, the inventive multilayer film must provide certain mechanical and physicochemical properties.

For instance, the inventive multilayer film has to provide a certain shrinkability. According to a specific embodiment of the present invention, a multilayer film of the present invention has a shrinkage value (shrinkability) in the range of from 10% to 70%, especially of from 20% to 60%, and preferably of from 30% to 50%, at a temperature of 90° C. in the longitudinal and/or transverse direction, preferably both in the longitudinal and transverse directions, especially as determined according to ASTM D2732. Particularly, the shrinkage value (shrinkability) may be determined as the unrestrained shrink at a temperature of 90° C. (water bath) for 10 seconds.

Furthermore, it is desirable when the inventive multilayer film provides certain oxygen barrier properties.

Particularly, the multilayer film of the present invention has an oxygen transmission rate ($O_2$ transmission rate) of less than 90 $cm^3/m^2/24$ hours, especially of less than 80 $cm^3/m^2/24$ hours, preferably of less than 75 $cm^3/m^2/24$ hours, and more preferably of less than 65 $cm^3/m^2/24$ hours, at a pressure of 1 atmosphere (101.325 kPa) and at a temperature of 23° C. Such oxygen transmission rate may be determined according to ASTM D-3985-81.

Preferably, the multilayer film of the present invention has an oxygen transmission rate ($O_2$ transmission rate) in the range of from 1 to 90 $cm^3/m^2/24$ hours, especially in the range of from 5 to 80 $cm^3/m^2/24$ hours, preferably in the range of from 10 to 75 $cm^3/m^2/24$ hours, and more preferably in the range of from 20 to 65 $cm^3/m^2/24$ hours, at a pressure of 1 atmosphere (101.325 kPa) and at a temperature of 23° C., especially as determined according to ASTM D-3985-81.

Furthermore, for use in packaging industry, it is desired that the multilayer film of the present invention provides a defined WVTR in the range of from 5 to 500 $g/m^2/24$ hours, especially in the range of from 10 to 400 $g/m^2/24$ hours, preferably in the range of from 25 to 300 $g/m^2/24$ hours, and more preferably in the range of from 50 to 250 $g/m^2/24$ hours. The WVTR may especially be determined according to ASTM F1249-06.

Furthermore, for use in the packaging industry, it is also desirable when the multilayer film of the present invention provides certain mechanical properties.

According to a particular embodiment, the multilayer film of the present invention has a tensile strength in the longitudinal and/or transverse direction, preferably both in the longitudinal and transverse directions, in the range of from 15 to 100 MPa, especially in the range of from 20 to 80 MPa, preferably in the range of from 25 to 75 MPa, and more preferably in the range of from 30 to 60 MPa. The tensile strength may especially be determined according to ASTM D-882, Method A.

Furthermore, according to another particular embodiment of the present invention, the multilayer film of the present invention has an elongation at break in the longitudinal and/or transverse direction, preferably both in the longitudinal and transverse directions, in the range of from 20 to 300%, especially in the range of from 40 to 200%, preferably in the range of from 60 to 175%, and more preferably in the range of from 75 to 160%. The elongation at break may especially be determined according to ASTM D-882, Method A.

Furthermore, according to another particular embodiment of the present invention, the multilayer film of the present invention has a (tensile) modulus in the longitudinal and/or transverse direction, preferably both in the longitudinal and transverse directions, in the range of from 100 to 400 MPa, especially in the range of from 150 to 400 MPa, preferably in the range of from 175 to 375 MPa, and more preferably in the range of from 200 to 350 MPa. The respective (tensile) modulus may especially be determined from the respective tensile curve.

In order to be usable in food packaging industries, the multilayer film of the present invention should provide a certain overall thickness. Usually, the multilayer film of the present invention has an overall thickness in the range of from 5 to 500 micrometers, especially in the range of from 10 to 400 micrometers, preferably in the range of from 20 to 300 micrometers, more preferably in the range of from 30 to 200 micrometers, and even more preferably in the range of from 40 to 150 micrometers.

In order to fulfill certain mechanical and/or physicochemical requirements, it is preferred that the multilayer film of the present invention has an overall thickness of at least 5 micrometers, especially of at least 10 micrometers, preferably of at least 20 micrometers, more preferably of at least 30 micrometers, and even more preferably of at least 40 micrometers.

On the other hand, it is preferred that the multilayer film of the present invention has an overall thickness of up to 500 micrometers, especially of up to 400 micrometers, preferably of up to 200 micrometers, more preferably of up to 150 micrometers, and even more preferably of up to 100 micrometers.

Apart from the overall thickness of the multilayer film of the present invention, also the thicknesses of the various single layers and layer composites of the multilayer film of the present invention as well as their ratios are of importance, i.e. also the individual thicknesses of the various single layers and layer composites determine certain overall properties of the inventive multilayer film.

Particularly, for providing certain mechanical properties and defined oxygen barrier and water vapor transmission properties, it is of importance that the outer layer composite has a certain minimum thickness. The same applies as to the inner layer composites and the single inner layers: In order to have a certain absorption capacity or loadability, it is of importance that also the inner layer composite and/or the single inner layers, respectively, have a certain minimum thickness. Finally, with respect to the adhesive layer, it is of importance that the adhesive layer ensures a reliable adhesion between the inner layer composite and the outer layer composite (which also requires a certain minimum thickness of the adhesive layer).

According to a preferred embodiment of the present invention, the inner layer composite of the inventive multilayer film comprises from 20% to 50%, especially from 25% to 45%, and preferably from 30% to 40%, of the overall thickness of the multilayer film.

Furthermore, it is preferred that the inner layer composite of the inventive multilayer film has a thickness in the range of from 5 to 200 micrometers, especially in the range of from 7.5 to 100 micrometers, preferably in the range of from 10 to 75 micrometers, more preferably in the range of from 12.5 to 50 micrometers, and even more preferably in the range of from 20 to 40 micrometers.

Furthermore, according to a particular embodiment, each single inner layer of the inner layer composite, independently from one another, has a thickness in the range of from 1 to 100 micrometers, especially in the range of from 2 to 50 micrometers, preferably in the range of from 2.5 to 25 micrometers, more preferably in the range of from 3 to 20 micrometers, and even more preferably in the range of from 5 to 15 micrometers.

With respect to the outer layer composite of the inventive multilayer film, it is preferred that the outer layer composite of the inventive multilayer film comprises from 45% to 90%, especially from 50% to 80%, and preferably from 55% to 70%, of the overall thickness of the multilayer film.

Furthermore, it is preferred that the outer layer composite of the inventive multilayer film has a thickness in the range of from 5 to 300 micrometers, especially in the range of from 10 to 150 micrometers, preferably in the range of from 12.5 to 100 micrometers, more preferably in the range of from 15 to 75 micrometers, and even more preferably in the range of from 20 to 50 micrometers.

Moreover, it is preferred that each single outer layer of the outer layer composite, independently from one another, has a thickness in the range of from 2 to 100 micrometers, especially in the range of from 5 to 50 micrometers, preferably in the range of from 7.5 to 40 micrometers, more preferably in the range of from 10 to 30 micrometers, and even more preferably in the range of from 12.5 to 25 micrometers.

With respect to the adhesive layer (tie layer) of the inventive multilayer film, it is sufficient if the adhesive layer comprises from 1% to 25%, especially from 2% to 20%, and preferably from 5% to 15%, of the overall thickness of the multilayer film.

Usually, the adhesive layer of the inventive multilayer film has a thickness in the range of from 1 to 75 micrometers, especially in the range of from 2 to 50 micrometers, preferably in the range of from 3 to 40 micrometers, more preferably in the range of from 4 to 35 micrometers, and even more preferably in the range of from 5 to 30 micrometers.

As explained above, the thickness ratios of the various layers and layer composites of the inventive multilayer film are of importance and determine the mechanical and physicochemical properties of the inventive multilayer film. Usually, it is preferred that the thickness ratio [outer layer composite:inner layer composite:adhesive layer] is [45-80: 20-50:1-20], especially [50-75: 40-25:2-15], and preferably [55-75: 25-45:1-10].

Usually, all layers and layer composites of the inventive multilayer film are adhered to one another. Especially, all layers and layer composites of the inventive multilayer film are coextruded.

As explained above, the multilayer film, especially the multilayer thermoplastic film, of the present invention may be used for food packaging, especially to provide the encased foodstuff with a food additive. For this purpose, the multilayer film of the present invention, on its inner side, is to be provided or loaded with at least one food additive. In order to fulfill this requirement, the multilayer film of the present invention has to exhibit a certain absorption capacity or loadability with respect to the at least one food additive to be transferred and/or released onto the foodstuff surface to be treated.

Particularly, the multilayer film of the present invention has a relative weight-based loadability (absorption capacity) with respect to the at least one food additive, based on the overall dry weight of the multilayer film, of at least 10 wt. %, especially of at least 20 wt. %, preferably of at least 25 wt. %, more preferably of at least 30 wt. %, and even more preferably of at least 40 wt. %.

According to a particular embodiment, the multilayer film of the present invention has a relative weight-based loadability (absorption capacity) with respect to the at least one food additive, based on the overall dry weight of the multilayer film, of up to 50 wt. %, especially of up to 75 wt. %, preferably of up to 90 wt. %, more preferably of up to 100 wt. %, and even more preferably of up to 150 wt. %.

Usually, the multilayer film of the present invention has a relative weight-based loadability (absorption capacity) with respect to the at least one food additive, based on the overall dry weight of the multilayer film, in the range of from of 10 wt. % to 150 wt. %, especially in the range of from of 20 wt. % to 130 wt. %, preferably in the range of from of 25 wt. % to 120 wt. %, more preferably in the range of from of 30 wt. % to 115 wt. %, and even more preferably in the range of from 40 wt. % to 110 wt. %.

This means that the inventive multilayer film may absorb even more food additive than its own weight. This is due to the foamed structure of the inner layer composite of the inventive multilayer film and also due to the capillary effect resulting from the existence of multiple porous inner layers, as will be explained more in detail hereinbelow.

With respect to the at least one food additive, this food additive may comprise a flavoring and/or coloring and/or aroma producing food additive, especially in the form of a preferably aqueous solution or dispersion, particularly a liquid smoke or caramel. An emulsion made from a food grade oil and herb or spice particulates, such as ground peppers, may also be a food additive of choice. These additives are well known to the skilled practitioner.

Usually, the multilayer film of the present invention, especially the inner layer composite with the plurality of single inner layers, is capable of reversibly retaining and/or absorbing the at least one food additive and to again release and/or transfer the retained and/or absorbed food additive to a foodstuff encased in or with the multilayer film, especially when the encased foodstuff is subjected to cooking and/or processing.

In order to provide a high loadability or absorption capacity with respect to food additives, the multilayer film of the present invention has to exhibit a certain porosity. Particularly, the multilayer film of the present invention has a relative volume-based porosity, based on the overall volume of the inventive multilayer film, in the range of from 5 to 80 Vol.-%, especially in the range of from 10 to 75 Vol.-%, preferably in the range of from 15 to 70 Vol.-%. Particularly, the porosity of the multilayer film is provided by the multitude of voids comprised by the single inner layers of the inner layer composite.

With respect to the inner layer composite of the inventive multilayer film, the following properties are useful for use in food packaging industry:

Usually, the inner layer composite comprises at least two, and preferably at least three single inner layers. Surprisingly, applicant has discovered that, probably due to capillary effects (without being bound to this theory), the fact that an inner layer composite consisting of two or three or even more single inner layers absorbs or retains more food additive than does a single inner layer of the same overall thickness.

Usually, the plurality of single inner layers of the inner layer composite are attached and/or adhered to one another via coextrusion.

The various single inner layers of the inner layer composite may have the same or different chemical compositions, and preferably the same chemical composition.

Particularly, the various single inner layers of the inner layer composite, either the same or different and independently from each other, each comprise at least one polyolefinic polymer, copolymer or terpolymer, especially at least one polyethylene polymer, copolymer or terpolymer, especially one selected from the group consisting of LDPEs, LLDPEs, VLDPEs as well as blends and copolymers and terpolymers thereof, particularly copolymers and terpolymers with $C_3$-$C_{10}$-alpha-olefins or alkyl (meth)acrylates.

Especially, the various single inner layers of the inner layer composite, either the same or different and independently from each other, each comprise at least one polyolefin, especially at least one polyolefinic polymer, copolymer or terpolymer, having a density in the range of from 0.910 to 0.940 g/cm$^3$, especially as determined according to ASTM D792.

According to a particular embodiment of the present invention, it is preferred that the various single inner layers of the inner layer composite, either the same or different and independently from each other, each comprise at least 60 wt. %, especially at least 75 wt. %, preferably at least 80 wt. %, more preferably at least 85 wt. %, even more preferably at least 90 wt. %, and even more preferably at least 95 wt. %, of the at least one polyolefin, especially of the at least one polyolefinic polymer, copolymer or terpolymer, based on the overall dry weight of the respective single inner layer.

As described hereinabove, the single inner layers of the inner layer composite of the inventive multilayer film each comprise a multitude of voids, especially open cells or pores, which voids are capable of reversibly retaining and/or absorbing at least one food additive.

Particularly, the multitude of voids of the single inner layers of the inner layer composite are particularly generated by (co-)extrusion of the single inner layers in the presence of at least one foaming agent. Particularly, the at least one foaming agent may be selected from the group consisting of physical and chemical foaming agents, preferably chemical foaming agents, especially chemical foaming agents liberating gaseous compounds, preferably selected among organic or inorganic carbonates, organic carboxylic acids and their esters, azo compounds, hydrazine derivatives, semicarbazides, tetrazoles and their combinations. Particularly useful results are obtained if a combination of alkali or earth alkali carbonates or bicarbonates together with an organic carboxylic acid, particularly citric acid, is used as a foaming agent. During the (co-)extrusion process, the chemical foaming agent is decomposed, liberating gaseous compounds, especially carbon dioxide or other gases. This leads to a porous structure of the single inner layers of the inner layer composite, showing a multitude of voids as described above. By subsequent stretching or orientation of the coextruded multilayer film, the voids may be extended or enlarged and if necessary, opened, so that a multitude of open voids results.

As described before, the voids of the single inner layers of the inner layer composite are open voids, especially in the form of open cells or pores. This enables the absorption of a food additive.

Particularly, the single inner layers are each in the form of a rigid, solidified or stiffened open-voided foam, especially having an irregularly and/or randomly web-like, net-like, meshed, reticular or honeycomb-like structure with respect to a two-dimensional projection plane of the foam. Particularly, the voids are each entirely surrounded and/or bordered by walls composed of the polymer comprising at least one polyolefin.

Usually, the voids of the single inner layers of the inner layer composite each have absolute cross-sectional sizes, referred to a two-dimensional projection plane, in the range of from 0.001 to 10 mm$^2$, especially in the range of from 0.005 to 8 mm$^2$, preferably in the range of from 0.01 to 7 mm$^2$, as determined by digital image processing of two-dimensional micrographs of the single inner layers of the inner layer composite. Particularly, 30% to 80% of the voids have absolute cross-sectional sizes below 1.0 mm$^2$, especially below 0.8 mm$^2$. Particularly, 70% to 95% of the voids have absolute cross-sectional sizes below 3 mm$^2$, and especially below 1.5 mm$^2$.

According to a particular embodiment, the voids of the single inner layers of the inner layer composite each have average (i.e. median) cross-sectional sizes, referred to in a two-dimensional projection plane, in the range of from 0.01 to 5 mm$^2$, especially in the range of from 0.05 to 2 mm$^2$, and preferably in the range of from 0.1 to 1 mm$^2$, especially determined by digital image processing of two-dimensional micrographs of the single inner layers.

Especially, it is preferred that the voids of the single inner layers of the inner layer composite in their totality comprise from 10% to 80%, especially from 20% to 70%, and preferably from 30% to 60%, of the surface area of the single inner layers, referred to a two-dimensional projection plane, especially determined by digital image processing of two-dimensional micrographs of the single inner layers of the inner layer composite.

With respect to the outer layer composite of the multilayer film of the present invention, the outer layer composite usually comprises a plurality of single outer layers attached and/or adhered to one another, especially coextruded to one another, wherein the single outer layers each comprise at least one polyamide.

The outer layer composite of the inventive multilayer film is mostly responsible for the mechanical properties and part of the physicochemical properties, especially the $O_2$ barrier properties and the WVTR.

Usually, the outer layer composite comprises at least two, preferably at least three single outer layers. Surprisingly, also with this aspect of the present invention, applicant has found that a plurality of single outer layers provides improved mechanical and physicochemical properties as compared to a single outer layer of the same thickness.

According to a specific embodiment of the present invention, the plurality of single outer layers of the outer layer composite are attached and/or adhered to one another via coextrusion.

The various single outer layers of the outer layer composite may have the same or a different chemical compositions, and preferably the same chemical composition.

Especially, the various single outer layers of the outer layer composite, the same or different and independently from each other, each comprise at least one polyamide, particularly at least one polyamide ("PA") polymer, copolymer or terpolymer, especially one selected from the group consisting of aliphatic, semiaromatic and aromatic polyamides as well as blends thereof, particularly selected from the group consisting of PA 6, PA 66, PA 6.66, PA 6.11, PA 6.12, PA 11 and PA 12 as well as blends thereof, optionally combined with at least one amorphous polyamide or copolyamide such as PA 6/6T.

According to a typical embodiment, the various single outer layers of the outer layer composite, being the same or different and independently from one another, each comprises at least 70 wt. %, especially at least 75 wt. %, preferably at least 80 wt. %, more preferably at least 85 wt. %, even more preferably at least 90 wt. %, and even more preferably, at least 95 wt. %, of the at least one polyamide, based on the overall dry weight of the respective single outer layer.

With respect to the adhesive layer (tie layer) of the multilayer film of the present invention, the adhesive layer is disposed between the inner layer composite and the outer layer composite, especially adhered to and/or coextruded with the inner layer composite and the outer layer composite.

Usually, the adhesive layer, via its opposite sides, is directly adhered to and/or directly coextruded with the inner layer composite, on the one hand, and the outer layer composite, on the other hand.

The adhesive layer preferably comprises one single, continuous layer of adhesive. Since the function of the adhesive layer is to safely adhere the inner layer composite, on the one hand, to the outer layer composite, on the other hand, it is sufficient to provide this function by a single-layered adhesive layer. Nevertheless, it is also possible to use a multi-layered adhesive structure although not preferred according to the present invention.

In order to ensure a safe adherence, the adhesive layer usually comprises an adhesive composition compatible with and/or adherent to both the inner layer composite and also the outer layer composite.

According to a preferred embodiment of the present invention, the adhesive layer comprises preferably an elastomeric polyolefin-based adhesive, especially a preferably elastomeric polyethylene-based adhesive, especially selected from the group consisting of rubber-modified and/or grafted polyethylenes, particularly selected from the group consisting of rubber-modified and/or maleic anhydride grafted polyethylenes.

According to a particular embodiment of the present invention, there is provided an inventive multilayer film, as described hereinbefore, wherein the outer layer composite comprises at least two single outer layers, particularly exactly two single outer layers, which single outer layers are attached and/or adhered to one another via coextrusion and/or which single outer layers, independently from one another, each comprise at least one polyamide, particularly at least one polyamide polymer, copolymer or terpolymer, especially selected from the group consisting of aliphatic, semiaromatic and aromatic polyamides as well as blends thereof, particularly selected from the group consisting of PA 6, PA 66, PA 6.66, PA 6.11, PA 6.12, PA 11 and PA 12 as well as blends thereof, optionally combined with at least one amorphous polyamide or copolyamide such as PA 6I/6T; and wherein the inner layer composite comprises at least four single inner layers, particularly exactly four single inner layers, which single inner layers are attached and/or adhered to one another via coextrusion and/or which single inner layers, independently from one another, each comprise at least one polyolefinic polymer, copolymer or terpolymer, especially at least one polyethylene polymer, copolymer or terpolymer, especially selected from the group consisting of LDPEs, LLDPEs, VLDPEs as well as blends and copolymers and terpolymers thereof, particularly copolymers and terpolymers with $C_3$-$C_{10}$-alpha-olefins or alkyl (meth)acrylates, and/or which single inner layers, independently from one another, each comprise at least one polyolefin, especially at least one polyolefinic polymer, copolymer or terpolymer, having a density in the range of from 0.910 to 0.940 g/cm³, especially as determined according to ASTM D792.

According to yet another particular embodiment of the present invention, there is provided an inventive multilayer film, as described hereinbefore, wherein the multilayer film furthermore comprises at least one additional layer disposed between the inner layer composite and the adhesive layer, especially adhered to and/or coextruded with the inner layer composite and the adhesive layer. Especially, according to this particular embodiment, the additional layer is preferably a continuous layer, especially a uniform and/or homogeneous and/or uninterrupted and/or non-foamed layer, particularly without any voids. This particular embodiment provides several additional advantages: On the one hand, by the presence of the additional and preferably continuous layer disposed between the inner layer composite and the adhesive layer, the adhesion is improved since a continuous layer provides a better adhesion than a foamed and non-continuous layer; on the other hand, the presence of the additional and preferably continuous layer also improves the barrier properties of the inventive, especially the water vapor barrier properties. According to this particular embodiment, it is preferred that the additional layer comprises from 1% to 30%, especially from 2% to 25%, preferably from 5% to 20%, of the overall thickness of the multilayer film. Furthermore, according to this particular embodiment, it is also preferred that the additional layer has a thickness in the range of from 1 to 80 micrometers, especially in the range of from 2 to 60 micrometers, preferably in the range of from 3 to 45 micrometers, more preferably in the range of from 4 to 40 micrometers, even more preferably in the range of from 5 to 35 micrometers. Especially, the additional layer may have a chemical composition which is compatible with and/or similar to and/or same as the inner layer composite, especially the single inner layers.

According the aforedescribed particular embodiment of the present invention, according to which the multilayer film furthermore comprises at least one additional layer disposed between the inner layer composite and the adhesive layer, it is further preferred that the additional layer comprises at least one polyolefinic polymer, copolymer or terpolymer, especially at least one polyethylene polymer, copolymer or terpolymer, especially selected from the group consisting of LDPEs, LLDPEs, VLDPEs as well as blends and copolymers and terpolymers thereof, particularly copolymers and terpolymers with $C_3$-$C_{10}$-alpha-olefins or alkyl (meth)acrylates. Especially, the additional layer may comprise at least one polyolefin, especially at least one polyolefinic polymer, copolymer or terpolymer, having a density in the range of from 0.910 to 0.940 g/cm³, especially as determined according to ASTM D792. Especially, the additional layer may comprise at least 60 wt. %, especially at least 75 wt. %, preferably at least 80 wt. %, more preferably at least 85 wt. %, even more preferably at least 90 wt. %, even more preferably at least 95 wt. %, of the at least one polyolefin, especially of the at least one polyolefinic polymer, copolymer or terpolymer, based on the overall dry weight of the additional layer.

According the aforedescribed particular embodiment of the present invention, according to which the multilayer film furthermore comprises at least one additional layer disposed between the inner layer composite and the adhesive layer, it is also preferred that the outer layer composite may comprise at least two single outer layers, particularly exactly two single outer layers, which single outer layers are attached and/or adhered to one another via coextrusion and/or which single outer layers, independently from one another, each comprise at least one polyamide, particularly at least one polyamide polymer, copolymer or terpolymer, especially selected from the group consisting of aliphatic, semiaromatic and aromatic polyamides as well as blends thereof, particularly selected from the group consisting of PA 6, PA 66, PA 6.66, PA 6.11, PA 6.12, PA 11 and PA 12 as well as blends thereof, optionally combined with at least one amorphous polyamide or copolyamide such as PA 6I/6T; and that the inner layer composite comprises at least three single inner layers, particularly exactly three single inner layers, which single inner layers are attached and/or adhered to one another via coextrusion and/or which single inner layers, independently from one another, each comprise at least one polyolefinic polymer, copolymer or terpolymer, especially at least one polyethylene polymer, copolymer or terpolymer, especially selected from the group consisting of LDPEs, LLDPEs, VLDPEs as well as blends and copolymers and terpolymers thereof, particularly copolymers and terpolymers with $C_3$-$C_{10}$-alpha-olefins or alkyl (meth)acrylates, and/or which single inner layers, independently from one another, each comprise at least one polyolefin, especially at least one polyolefinic polymer, copolymer or terpolymer, having a density in the range of from 0.910 to 0.940 g/cm$^3$, especially as determined according to ASTM D792.

On the whole, the present invention thus constitutes a significant milestone with respect to providing high-performance coextrudable thermoplastic multilayer films having a high absorption capacity or loadability as to food additives, especially on the basis of food flavorants and/or colorants and/or those providing an aroma, particularly based on preferably aqueous solutions or dispersions thereof.

In the following, typical embodiments of the present invention will be described in more detail, without being limiting to the present invention.

The present invention thus solves the longstanding problem described above by providing a thermoplastic multilayer film impregnated with e.g. a solution or dispersion of at least one food additive on its inner food contacting layer. The food additive may be selected from the group consisting of food colorants, food flavorants, aroma producing additives, food processing and peeling aids as well as mixtures thereof. Such casing, when stuffed with foodstuff, particularly with sausage or whole meat emulsions, releases its additive onto the surface of the encased foodstuff during the processing, thus producing a flavored and/or colored final foodstuff product.

The inventive film is a preferably thermoplastic multilayer casing of at least three layer composites of the following structure: a first inner layer composite composed of several layers each comprising a foamed polyolefin, a second outer barrier or use-resistant layer composite composed of several layers each comprising a polyamide and, finally, a third intermediate adhesive or tie layer disposed therebetween (i.e. between the first and second layer composites). The first inner layer composite is the food contacting layer. A typical structure of an inventive multilayer film may also be shown as the following, starting from the first layer composite to the second outer layer composite: foamed polyolefin inner layer composite (composed of 2 or more single inner layers)/adhesive layer/barrier or use-resistant polyamide outer layer composite (composed of 2 or more single outer layers).

The inner layer composite of the inventive film contains ruptured or open-pored foam cells due to the addition of a foaming agent to the polyolefin resin prior to extrusion. These open cells are reservoirs for any food additive that is introduced to this layer.

Foaming agents are well known in the art and include chemical foaming agents as well as physical foaming agents. Chemical foaming agents are especially additives used in the manufacture of foamed products. Most are organic chemicals, although some inorganics are also used. They are introduced into the polymeric resin prior to extrusion and produce foam by decomposing at processing temperatures, liberating gases into the polymer melt and thereby forming bubbles or cells in the extruded polymer. Nucleating agents may be a part of chemical foaming agents and will remain in the foamed polyolefin layer. Alternatively, physical blowing agents do not undergo chemical transformation but rather their blowing gas is liberated by physical processes, such as e.g. the vaporization of a low-boiling liquid or by release of pressure in a compressed gas.

Currently, in the prior art, the key reason for manufacturing foamed plastics of any sort is to reduce their density, which lowers the weight of the finished product and reduces raw material costs. A prime and early example of a blown polymer is the production of Styrofoam®. Other products made of a foamed or blown polymer are trash bags (to reduce their costs and to increase their strength) and bottle cap liners (in order to have a deformable liner inside the screw top of a bottle). However, according to the prior art, foaming agents have not yet been used to provide an increased absorption capacity in thermoplastic multilayer films.

A preferred embodiment of the present invention is a preferably thermoplastic multilayer casing with at least a three layer composite comprising a first foamed polyethylene inner layer composite composed of several single inner layers and a second polyamide outer layer composite composed of several single outer layers as well as an intermediate adhesive monolayer.

For the inner layer composite material, according to a particularly preferred embodiment of the present invention, polyethylene selected from the group consisting of low density polyethylenes and linear low density polyethylenes as well as blends thereof may be used.

According to a particular embodiment, further additional layers may be added to the inventive film to provide additional features to the film, such as increased oxygen and/or moisture barrier properties, or to add strength to the film. For instance, multiple directly adjacent layers of the foamed inner single layers produce deeper voids or cells, which again allow for the retention of greater amounts of for example, solutions or dispersions of food additives than would a single foamed layer of the same overall thickness.

Additionally, color may be added to each of the individual layers by introducing color concentrates to the resin prior to extrusion. One or more of the layers may be colored all one color to produce a solid colored film, or individual layers may be colored differently from other layers, and some of the layers may have no coloring added to them, in order to form specific patterns in the finished film.

Once the film is made, the inner layer composite may be provided or impregnated with a food additive selected from processing aids, peeling aids, liquid smoke and/or caramel or other flavorants and/or colorants and/or aroma producing additives, or mixtures thereof. Additional components of these solutions comprising food additives may also include polyethylene glycol, antifoaming agents, spot prevention agents and alkali hydroxides, each ingredient providing properties as are all well known in the art. Additional peeling modifiers and processing aids may also be included.

The food additive coating or impregnation may be applied to the inventive film in a number of well-known ways, such as by spraying, slugging, blade coating or roll-coating.

If the inventive film is produced as a flat sheet, it may be formed into a tube and sealed with a strip of compatible thermoplastic material. Any other sealing method well-known to those skilled in the art may also be used. At this point, the casing may be impregnated with the desired food additive materials, stuffed with food product, and further processed.

If the inventive casing is tubular, it may be shirred and then stuffed on automatic stuffing machines and thermally processed to produce sausages, deli meats or other food products.

During the cooking cycle, the flavorant and/or colorant retained on the inner food contacting layer is transferred from this layer of the casing to the outer surface of the encased cooked product, thus delivering the desired flavoring and/or coloring.

Although the inventive film is described as having three layer composites, even more layers may be added if desired. For example, if different moisture or oxygen barrier properties are desired, additional interior or exterior layers may be added to the laminate in a manner that is well known to those skilled in the art. In one example of this, it is known that the barrier layer may comprise any suitable material, such as e.g. the preferred nylon of this invention, nylon 6 or ethylene vinyl alcohol or polyvinylidene chloride, and is preferably positioned between the adhesive layer and the outer thermoplastic layer, possibly adjacent to the preferred outer polyamide layer, with or without an additional adhesive layer. Another example is that of a second moisture barrier layer adjacent to the outer thermoplastic layer. Alternatively, the thermoplastic layers may be placed next to each other while still hot, allowing the layers to melt or bond with one another, as well as the two outer layers directly bonding with each other. In these cases, the adhesive layer is not necessary to the inventive film. A preferably thermoplastic multilayer film comprising a foamed polyolefin inner layer composite, an intermediate adhesive layer and a thermoplastic polyamide outer layer composite and an additional outer thermoplastic layer, wherein the thermoplastic outer layer composite may comprise an oxygen barrier and wherein the additional outer thermoplastic layer may comprises a moisture barrier and use-resistant layer, is another example of the inventive film.

A preferred embodiment of the present inventive film consists of the following layers (from inside to outside): (A) food contacting inner layer composite (composed of 3 or more single inner foamed porous polyethylene containing layers)/(C) adhesive layer (usually composed of 1 layer)/(B) outer layer composite (composed of two or more single inner polyamide containing layers). Variations of the order of the layers may be made as known to those skilled in the art, but once formed into a tubular casing, the foamed polyolefin layer is to be the interior layer that is adjacent to the foodstuff and the polyamide layer is to be the outer layer due to its barrier use-resistant and melt properties.

The inner foamed polyolefin containing layers may be made from one or more polyolefins such as low density polyethylenes (LDPE), linear low density polyethylenes (LLDPE), very low density polyethylenes (VLDPE), polypropylenes, copolymers of ethylene with at least one $C_3$-$C_{10}$-alpha-olefins and ethylene polymers having at least one functional moiety selected from the group of esters, anhydrides and carboxylic acids including copolymers of ethylene with a vinyl ester, copolymers of ethylene with an alkyl acrylate and blends of such polyolefins. The foamed inner polyolefin layers should be able to absorb sufficient quantities of food flavorant and/or colorant solution, so that, after processing the encased foodstuff, the absorbed flavorant and/or colorant is transferred to the surface of the encased sausage or foodstuff in a desired amount.

Polyolefin as that term is used herein particularly refers to a hydrocarbon polymer derived from a simple olefin, for example such as polyethylene or polypropylene and copolymers and terpolymers of such olefins. Polyolefins used in the present invention unless otherwise noted are substantially free (except for incidental amounts such as trace residues of catalysts or process related contaminants) of halogens, oxygen or other elements apart from carbon and hydrogen. However, these polyolefins may optionally have other polymers or substances, such as processing aids, ultraviolet light stabilizers or antioxidants, in admixture.

The term polyethylene as used herein is especially the name for a polymer the basic structure of which is characterized by the chain $(CH_2-CH_2)_n$. Polyethylene homopolymers are generally described as being solids at room temperature, which have a partially amorphous phase and a partially crystalline phase with a density of from 0.915 to 0.970 g/cm$^3$. The relative crystallinity of polyethylene is known to affect its physical properties. The amorphous phase imparts flexibility and high impact strength while the crystalline phase imparts a high softening temperature and rigidity.

Foaming agents are also well known in the art and include chemical blowing agents and physical blowing agents. Chemical blowing agents are additives used in the manufacture of foamed products. Most are organic chemicals, although some inorganics are also used. They are introduced into the polymer prior to extrusion and produce foam by decomposing at processing temperatures, liberating gases into the polymer melt and thereby forming bubbles or cells in the polymer. Physical blowing agents do not undergo chemical transformation but rather the blowing gas is liberated by physical processes, such as the vaporization of a low-boiling liquid or by release of pressure in a compressed gas. The main reason for manufacturing foamed plastics is their greatly reduced density, lowering the weight of the finished product and reducing raw material costs.

A foamed polyolefin or polyethylene layer composite as used herein for the inner layer composite, and when formed into a tube is the inner food contacting layer of the inventive casing comprising the polyolefin or polyethylene which has been mixed with a chemical foaming agent and processed at the temperature needed to undergo the chemical reaction resulting in the liberation of the blowing gas while other reaction products, such as the sodium remaining from the use of sodium bicarbonate, remain in the polyolefin or polyethylene layer composite. The inner layer composite may also be foamed with physical blowing agents that generally do not leave any reaction products in the polyolefin layer.

As to the adhesive or tie layer, various adhesives are well known in the art and may be used to adhere the inner absorbent layer composite to the polyamide containing outer layer composite. In particular, it has been found that a maleic anhydride modified elastomeric polyolefinic adhesive is a preferred adhesive, as the inner foamed layer composite does then not easily delaminate from the nylon layer composite after the food has been processed. Other adhesives may be used in this adhesive layer, as are well known in the art.

The polyamide containing outer layer composite is usually, at the same time, both a use-resistant layer and a moisture and oxygen barrier layer. Use-resistant layers are needed to withstand contact with sharp objects and provide abrasion resistance. As to the exterior surface or outer PA layer composite of the inventive multilayer film, it is therefore subject to handling and use, e.g. as a protection against equipment during packaging and from rubbing against other surfaces during the production of cooked food products. This contact causes abrasive forces, stresses and pressures which might abrade away the film, causing punctures or breaches in the integrity of the package and causing loss of food product due to contamination. Therefore, the exterior surface PA outer layer composite may typically be made from materials chosen to be resistant to abrasive and puncture forces and other stresses which the packaging may encounter during use. Generally, the exterior surface layer should be easy to machine (i.e. be easy to feed through and be manipulated by machines when being formed into tubular casings and stuffed with food emulsions). Suitable stiffness, flexibility, flex-crack resistance, modulus, tensile strength, coefficient of friction, printability, optical properties etc. are also frequently designed into exterior layers by suitable choice of materials.

Thus, the outer layer composite is preferred to be composed of bioriented polyamide single outer layers, particularly of bioriented nylon 6. Polyamides are well known in the art as film layers. Polyamides and copolyamides, such as nylon 6.66, are useful for providing a measure of mechanical strength, ease of stretch orientation and oxygen barrier properties to the film. Polyamides are polymers having recurring amide (—CONH—) linking units in the molecular chain and include nylon resins, which are well-known polymers having a multitude of uses including utility as packaging films, bags and casings. Nylon is a generic term for synthetic and usually high molecular weight (Mw≤10,000) linear polyamides. Suitable nylons are commercially available and may be prepared by well-known methods including addition or self-condensation reactions, e.g. of amino acids or lactams and condensation reactions of diamines with diacids. Nylon polymers may be aliphatic, aromatic or amorphous. Suitable nylon polymers may be homopolymers or copolymers such as bipolymers and terpolymers and blends and modifications thereof. Suitable nylons for use in the present inventive film include nylon 6, nylon 12, nylon 66, nylon 6/12 copolymer, nylon 6/66 copolymer, nylon MXD6 copolymer and amorphous nylons such as PA 6I, PA 6T and PA 6I/6T. The especially preferred polyamides are aliphatic nylons such as nylon 6 and copolymers thereof. The nylon films used may be biaxially stretched, producing bioriented films (i.e. stretched or oriented in both the machine and transverse directions of the film).

In particular, the thermoplastic flexible oriented multilayer films of the present invention are useful in food packaging. It is further contemplated that blends of nylons may be employed and that blends of aliphatic nylons with aromatic nylons may be utilized. Preferred blends include blends of semicrystalline aliphatic nylons or a mixture of one or more semicrystalline aliphatic nylons with an amorphous nylon. A preferred amorphous nylon is nylon 6I/6T copolymer (which is commercially available under the trademark Selar® PA 3426 from the DuPont Company of Wilmington, Del., U.S.A.).

Once all layers of the have been laminated together, a flavoring and/or coloring solution may be applied to the absorptive foamed inner food contacting layer. This solution may comprise the coloring and/or flavoring agent, such as e.g. liquid smoke or caramel, water and optionally a peeling agent.

A coloring solution that imparts a level of brown color to the final processed product and that may be applied to the inner absorptive layer is an aqueous caramel solution of water, caramel and a peeling aid. The ultimate formula will depend on the type of caramel used and the desired color of the final product.

A flavoring agent used in the meat industry is liquid smoke, which can also be considered a coloring agent, depending on the type of liquid smoke used. Liquid smoke is also used to give a smoky flavor to the encased meat. Both tar containing and tar depleted liquid smokes may be used on the inventive film. The liquid smoke solution useful in the present invention comprises an aqueous solution of a peeling aid and liquid smoke. Additional components of the solution may include propylene glycol, sodium hydroxide to adjust the pH of the solution and an antifoaming agent.

These solutions may be applied to the absorbent foamed inner layer of the film in any number of ways. The solution may be sprayed onto the foamed layer. It may be applied by the blade coating method, a method where a coating solution is applied to a film that is usually supported and carried by a resilient backing roll, using a flexible doctor blade located some distance from and on the trailing side of the applicator, which serves to level the applied coating. In general, an excess of coating material is applied and the trailing blade then meters or removes the excess while uniformly spreading the coating onto the films surface (see U.S. Pat. No. 4,250,211).

Thus, as can be seen from the above description and explanations, the inventive multilayer films may be formed according to various embodiments.

According to a second aspect of the present invention, there is provided a food packaging film capable of releasing and/or transferring at least one food additive onto a surface of a foodstuff encased therein, wherein the food packing film comprises a multilayer film of the present invention as defined above, wherein the multilayer film of the present invention, preferably on its inner side, especially on the side of the inner layer composite, is provided with at least one food additive.

With respect to the food packaging film of the present invention, the multilayer film, preferably on its inner side, especially on the side of the inner layer composite, is impregnated with the at least one food additive. As described hereinbefore, the multilayer film, preferably its inner side, especially its inner layer composite, reversibly retains and/or absorbs the at least one food additive.

As also described hereinbefore, the at least one food additive comprises a flavoring and/or coloring and/or an aroma producing food additive, especially in the form of a preferably aqueous solution or dispersion, particularly a liquid smoke or caramel.

The amounts of the at least one food additive comprised by the inventive food packaging film may vary in wide ranges.

Usually, the food packing film of the present invention is provided with at least one food additive in weight-related amounts, based on the overall dry weight of the multilayer film, of at least 10 wt. %, especially of at least 20 wt. %, preferably of at least 25 wt. %, more preferably of at least 30 wt. %, and even more preferably of at least 40 wt. %.

Furthermore, also according to the usual embodiment of the present invention, the food packaging film of the present invention is provided with at least one food additive in weight-related amounts, based on the overall dry weight of the multilayer film, of up to 50 wt. %, especially of up to 75 wt. %, preferably of up to 90 wt. %, more preferably of up to 100 wt. %, and even more preferably of up to 150 wt. %.

Further, according to a typical embodiment, the food packaging film of the present invention is provided with at least one food additive in weight-related amounts, based on the overall dry weight of the multilayer film, in the range of from of 10 wt. % to 150 wt. %, especially in the range of from of 20 wt. % to 130 wt. %, preferably in the range of from of 25 wt. % to 120 wt. %, more preferably in the range of from of 30 wt. % to 115 wt. %, and even more preferably in the range of from of 40 wt. % to 110 wt. %.

According to a preferred embodiment of this aspect of the present invention, the present invention relates to a preferably thermoplastic multilayer food film, especially a casing, having a food contact inner layer composite composed of several open celled foamed polyolefin single inner layers and impregnated with a preferably food additive, which may include flavoring and/or coloring agents, wherein the food additive reversibly retained on the inner foamed layer composite may be transferred onto the surface of an encased foodstuff during cooking and/or processing, thus resulting in a colored and/or flavored food product.

With respect to further details as to the second aspect of the present invention, reference may be made to the above description of the first aspect of the present invention, which also applies as to the second aspect of the present invention accordingly.

Furthermore, according to a third aspect of the present invention, there is provided an encased foodstuff, especially a heat processed fat and/or protein containing foodstuff, preferably a meat containing foodstuff, which foodstuff is encased in a food packaging film as defined in an inventive food packaging film as defined hereinabove.

With respect to this aspect of the present invention, the foodstuff is usually in direct contact with the inner layer, especially with the inner layer composite, of the food packaging film and/or adheres thereto.

With respect to further details as to the third aspect of the present invention, reference may be made to the above explanations as to the other inventive aspects, which apply accordingly also to the third aspect of the present invention.

Furthermore, according to a fourth aspect of the present invention, the present invention also refers to the use of a multilayer film of the present invention as defined hereinabove for releasing and/or transferring at least one food additive onto a surface of a foodstuff, wherein the multilayer film, preferably on its inner side, especially on the side of the inner layer composite, is provided and/or impregnated with at least one food additive, followed by encasing a foodstuff to be treated in the multilayer film thus provided and/or impregnated.

For this purpose, the foodstuff is brought in direct contact with the inner layer, especially with the inner layer composite, of the multilayer film and/or is adhered thereto.

With respect to further details as to the fourth aspect of the present invention, reference may be made to the above explanations as to the other inventive aspects, which apply accordingly also to the fourth aspect of the present invention.

Furthermore, according to a fifth aspect of the present invention, the present invention refers to the use of a food packaging film of the present invention as defined hereinabove for releasing and/or transferring at least one food additive onto a surface of a foodstuff.

For this purpose, the foodstuff is encased in the food packaging film, especially wherein the foodstuff is brought in direct contact with the inner layer, especially with the inner layer composite, of the food packaging film and/or is adhered thereto.

With respect to further details as to the fifth aspect of the present invention, reference may be made to the above explanations as to the other inventive aspects, which apply accordingly also to the fifth aspect of the present invention.

Furthermore, according to a sixth aspect of the present invention, the present invention refers to a method for releasing at least one food additive onto a foodstuff surface and/or for providing a foodstuff surface with at least one food additive, wherein the method comprises the following method steps:

(a) providing and/or impregnating a multilayer film of the present invention as defined hereinabove, preferably on its inner side, especially on the side of the inner layer composite, with at least one food additive; then (b) encasing a foodstuff to be treated in the multilayer film thus provided and/or impregnated, especially bringing the foodstuff to be treated in direct contact with the inner layer, especially with the inner layer composite, of the multilayer film; then (c) releasing and/or transferring the at least one food additive onto a surface of the foodstuff encased in the multilayer film, especially during cooking and/or processing the foodstuff.

By applying the inventive method, it is possible to easily provide foodstuff surfaces with at least one food additive.

With respect to further details as to the sixth aspect of the present invention, reference may be made to the above explanations as to the other inventive aspects, which apply accordingly also to the sixth aspect of the present invention.

Furthermore, according to a seventh aspect of the present invention, there is provided a method for manufacturing a multilayer film of the present invention as defined hereinabove,
wherein the method comprises coextruding a plurality of single inner layers to form an inner layer composite, a plurality of single outer layers to form an outer layer composite and an adhesive layer (tie layer) disposed between the inner layer composite and the outer layer composite, wherein coextrusion of the single inner layers is performed in the presence of at least one foaming agent generating a multitude of voids in the single inner layers and/or the inner layer composite.

Usually, the at least one foaming agent may be selected from the group consisting of physical and chemical foaming agents, preferably chemical foaming agents, especially chemical foaming agents liberating gaseous compounds, preferably selected among organic or inorganic carbonates, organic carboxylic acids and their esters, azo compounds, hydrazine derivatives, semicarbazides, tetrazoles and their combinations.

According to a preferred embodiment, the at least one foaming agent is a chemical foaming agent liberating gaseous compounds selected from a combination of an alkali or earth alkali carbonate or bicarbonate together with an organic carboxylic acid or their esters, preferably citric acid.

Particularly good results are obtained if the at least one foaming agent is used in amounts of from 0.1 to 20 wt. %, especially 0.5 to 10 wt. %, particularly 1 to 6 wt. %, based on the weight of the starting coextrusion material of the single inner layers.

In order to obtain an efficient porosity of the inner layer composite and the single inner layers, respectively, coextrusion is performed above the decomposition temperature of the at least one foaming agent, thus leading to liberating gaseous compounds generating a multitude of voids in the single inner layers and/or the inner layer composite.

According to a usual embodiment, coextrusion is performed using an annular die, especially an annular multilayer die. Especially, the annular die comprises a plurality of preferably ring-like channels, with each channel being assigned to and/or corresponding to a single layer of the resulting multilayer film of the present invention.

Optionally, according to a preferred embodiment of the inventive manufacturing method, coextrusion is followed by stretching, especially monoaxially or biaxially stretching, preferably biaxially stretching, the coextruded multilayer film of the present invention.

With respect to further details as to the seventh aspect of the present invention, reference may be made to the above explanations as to the other inventive aspects, which apply accordingly also to the seventh aspect of the present invention.

Finally, according to an eighth aspect of the present invention, the present invention also refers to a method for manufacturing an inventive food packaging film as defined hereinbefore,
wherein the method comprises the following steps
(a) coextruding a plurality of single inner layers to form an inner layer composite, a plurality of single outer layers to form an outer layer composite and an adhesive layer (tie layer) disposed between the inner layer composite and the outer layer composite, wherein coextrusion of the single inner layers is performed in the presence of at least one foaming agent generating a multitude of voids in the single inner layers and/or in the inner layer composite, especially such that an inventive multilayer film as defined hereinbefore results; then
(b) optionally, stretching, especially monoaxially or biaxially stretching, preferably biaxially stretching, the coextruded multilayer film obtained in step (a); then
(c) providing the resulting and optionally stretched multilayer film, preferably on its inner side, especially on the side of the inner layer composite, with at least one food additive.

According to a usual embodiment, the at least one foaming agent used in step (a) may be selected from the group consisting of physical and chemical foaming agents, preferably chemical foaming agents, especially chemical foaming agents liberating gaseous compounds, preferably selected among organic or inorganic carbonates, organic carboxylic acids and their esters, azo compounds, hydrazine derivatives, semicarbazides, tetrazoles and their combinations.

Preferably, the at least one foaming agent used in step (a) may be a chemical foaming agent liberating gaseous compounds selected from a combination of an alkali or earth alkali carbonate or bicarbonate together with an organic carboxylic acid or their esters, preferably citric acid.

According to a usual embodiment, the at least one foaming agent used in step (a) may be utilized in amounts of from 0.1 to 20 wt. %, especially 0.5 to 10 wt. %, particularly 1 to 6 wt. %, based on the weight of the starting coextrusion material of the single inner layers.

Particularly, coextrusion in step (a) may be performed above the decomposition temperature of the at least one foaming agent, thus leading to liberating gaseous compounds generating a multitude of voids in the single inner layers and/or in the inner layer composite.

According to a preferred embodiment, coextrusion in step (a) is performed using an annular die, especially an annular multilayer die, especially wherein the annular die may comprise a plurality of preferably ring-like channels, with each channel being assigned to and/or corresponding to a single layer of the resulting multilayer film.

As to step (c) of the inventive manufacturing method for the inventive food packaging, in step (c) the multilayer film, preferably on its inner side, especially on the side of the inner layer composite, may be impregnated with the at least one food additive (usually by contacting the inner side with the at least one food additive, e.g. by slugging).

By the inventive manufacturing method for the inventive food packaging, the multilayer film, preferably on its inner side, especially on its inner layer composite, reversibly retains and/or absorbs the at least one food additive.

As described hereinabove with respect to other aspects of the present invention, the at least one food additive used in the inventive manufacturing method for the inventive food packaging may usually comprise a flavoring and/or coloring and/or aroma producing food additive, especially in the form of a preferably aqueous solution or dispersion, particularly a liquid smoke or caramel.

As also described hereinabove with respect to other aspects of the present invention, the amounts of the at least one food additive utilized in the manufacture of the inventive food packaging film may vary in wide ranges:

According to a usual embodiment, the food packaging film may be provided with at least one food additive in weight-related amounts, based on the overall dry weight of the multilayer film, of at least 10 wt. %, especially of at least 20 wt. %, preferably of at least 25 wt. %, more preferably of at least 30 wt. %, even more preferably of at least 40 wt. %.

On the other hand, according to another usual embodiment, the food packaging film is provided with at least one food additive in weight-related amounts, based on the overall dry weight of the inventive multilayer film, of up to 50 wt. %, especially of up to 75 wt. %, preferably of up to 90 wt. %, more preferably of up to 100 wt. %, even more preferably of up to 150 wt. %.

Generally, the food packaging film may be provided with at least one food additive in weight-related amounts, based on the overall dry weight of the inventive multilayer film, in the range of from of 10 wt. % to 150 wt. %, especially in the range of from of 20 wt. % to 130 wt. %, preferably in the range of from of 25 wt. % to 120 wt. %, more preferably in the range of from of 30 wt. % to 115 wt. %, even more preferably in the range of from of 40 wt. % to 110 wt. %.

With respect to further details as to the eighth aspect of the present invention, reference may be made to the above explanations as to the other inventive aspects, which apply accordingly also to the eighth aspect of the present invention.

Hereinafter, the present invention will be elucidated in more detail using preferred embodiments and figures. In connection with the elucidation of these preferred embodiments, which are, however, in no way restrictive as to the present invention, further advantages, particularities, properties, aspects and features of the present invention are also shown.

Figure 1A:
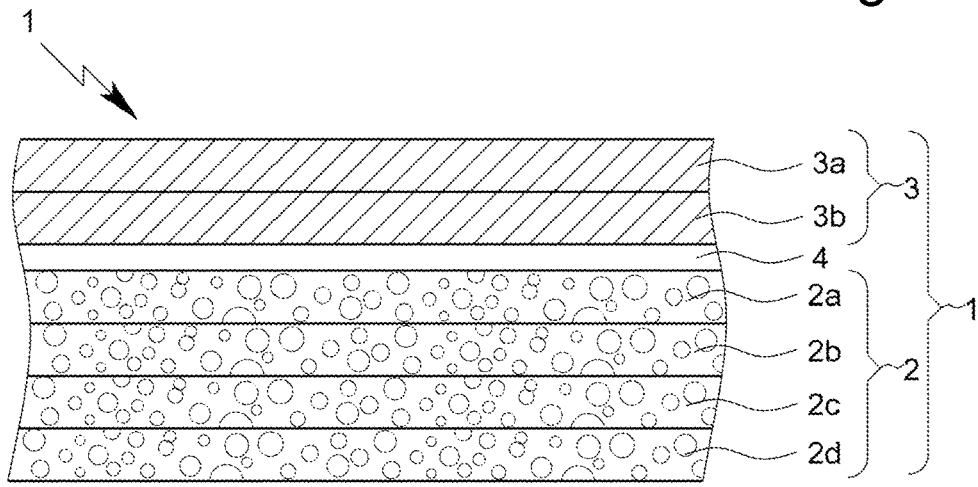
Figure 1B:
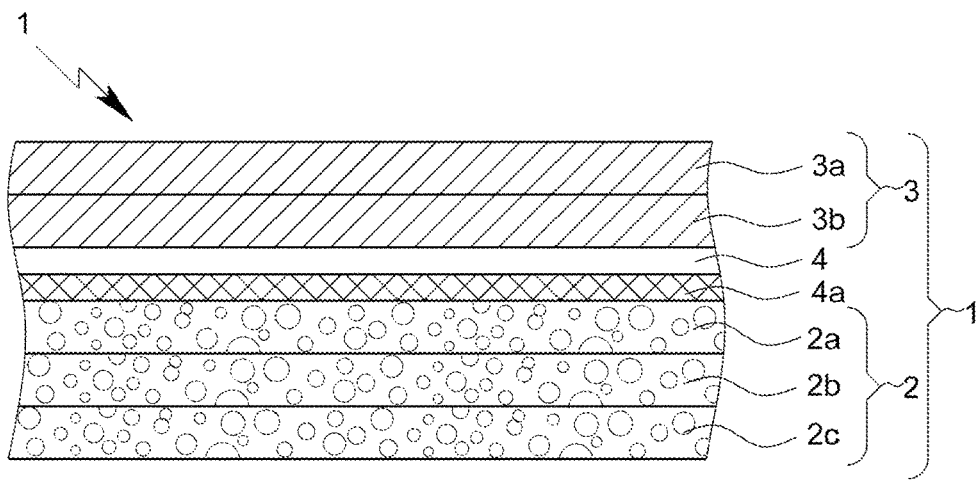
Figure 2A:
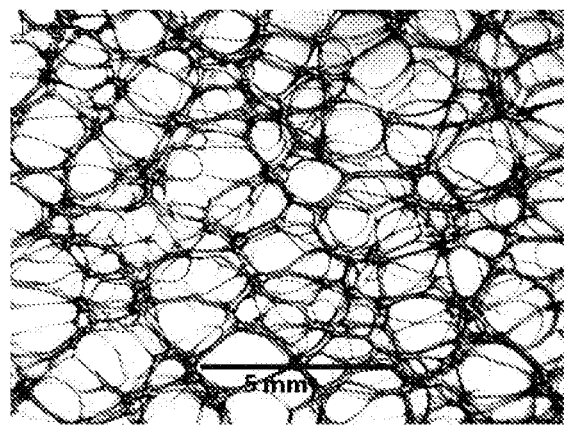
FIGS. 2A, 3A, 4A show transmitted light micrographs of the inner layer composites, especially the inner food contacting layer composites, of three different multilayer films of the present invention according to three particular embodiments.
Figure 2B:
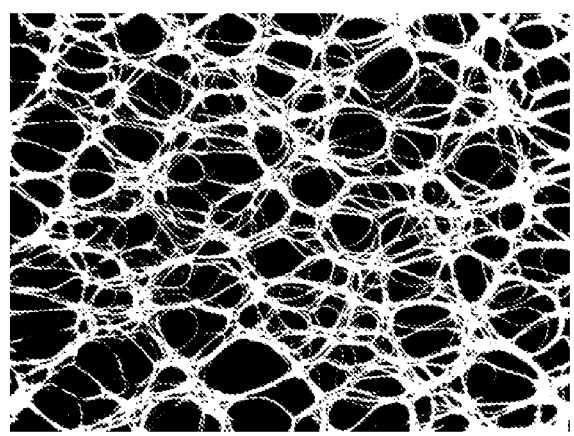
FIGS. 2B, 3B, 4B show the corresponding binary images (color inverted or negatives, respectively) of the transmitted light micrographs shown in FIGS. 2A, 3A, 4A.
Figure 2C:
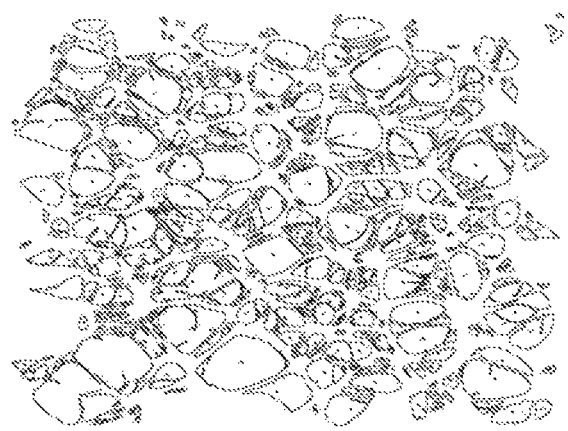
FIGS. 2C, 3C, 4C show the corresponding void size analysis results of the inner layer composites, especially the inner food contacting layer composites, of the three different inventive multilayer films, the transmitted light micrographs of which are shown in FIGS. 2A, 3A, 4A.
Figure 3A:
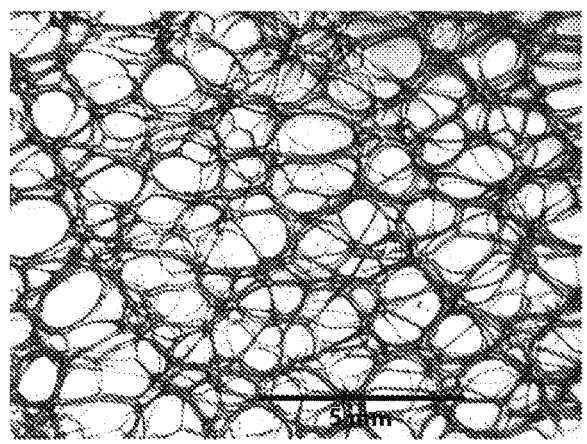
Figure 3B:
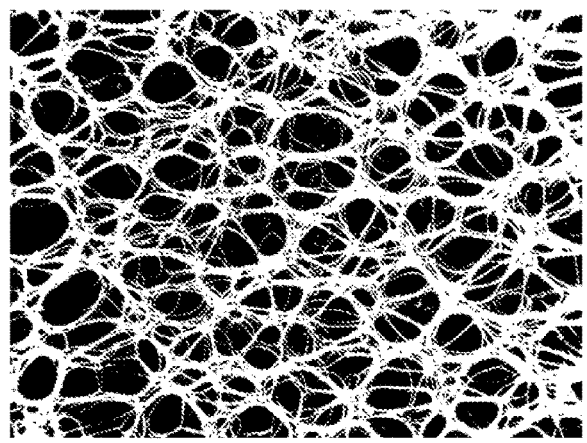
Figure 3C:
Figure 4A:
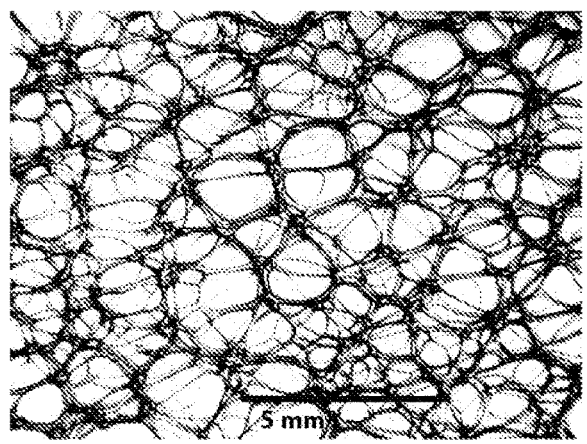
Figure 4B:
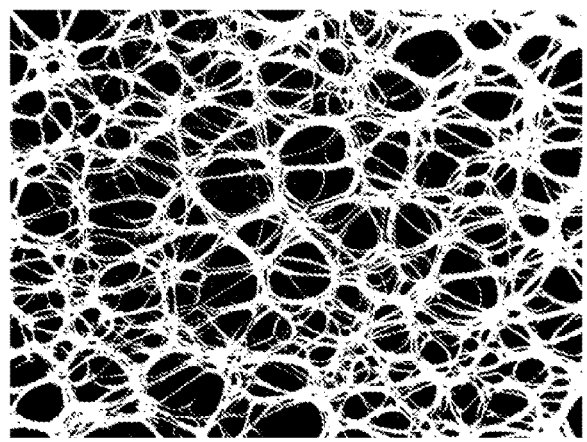
Figure 4C:
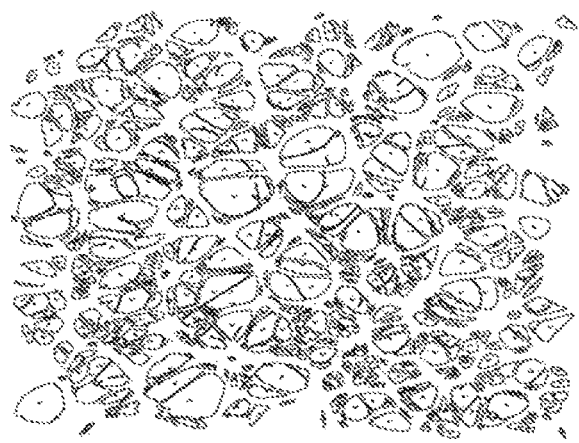
Figure 5A:
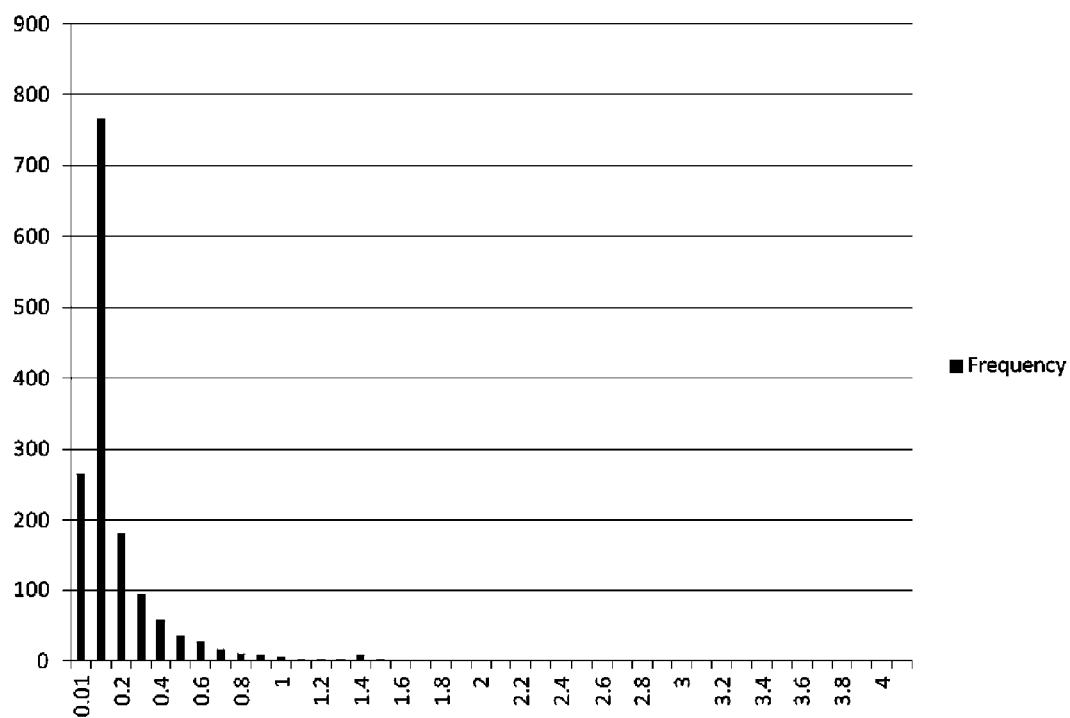
FIG. 5A shows the frequency distribution of the void area sizes (in $mm^2$) of different inventive multilayer films according to a particular embodiment.
Figure 5B:
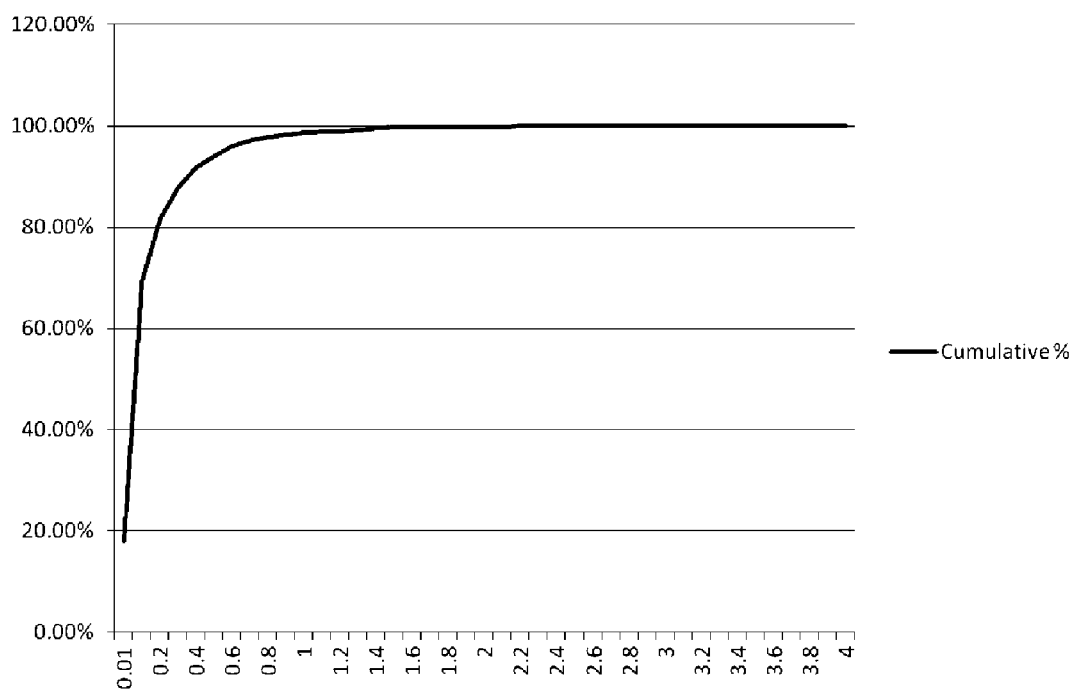
FIG. 5B shows the cumulative percentage-based distribution of the void area sizes (in $mm^2$) of different inventive multilayer films according to a particular embodiment.
Figure 6:
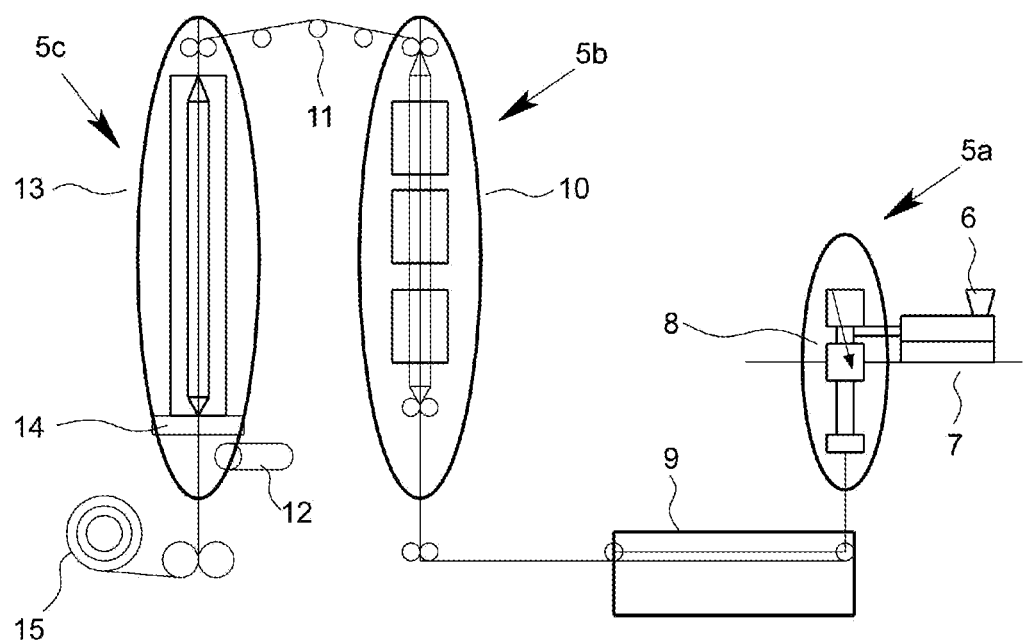
FIG. 6 shows a typical process course of an inventive manufacturing method for producing an inventive multilayer film or an inventive food packaging film, respectively, according to a particular embodiment.

In the figures:

FIGS. 1, 1A, 1B show schematic cross-sectional views of various inventive multilayer films of the present invention according to particular embodiments;

FIGS. 2A, 3A, 4A show transmitted light micrographs of the inner layer composites, especially the inner food contacting layer composites, of three different multilayer films of the present invention according to three particular embodiments;

FIGS. 2B, 3B, 4B show the corresponding binary images (color inverted or negatives, respectively) of the transmitted light micrographs shown in FIGS. 2A, 3A, 4A;

FIGS. 2C, 3C, 4C show the corresponding void size analysis results of the inner layer composites, especially the inner food contacting layer composites, of the three different inventive multilayer films, the transmitted light micrographs of which are shown in FIGS. 2A, 3A, 4A;

FIG. 5A shows the frequency distribution of the void area sizes (in mm$^2$) of different inventive multilayer films according to a particular embodiment;

FIG. 5B shows the cumulative percentage-based distribution of the void area sizes (in mm$^2$) of different inventive multilayer films according to a particular embodiment;

FIG. 6 shows a typical process course of an inventive manufacturing method for producing an inventive multilayer film or an inventive food packaging film, respectively, according to a particular embodiment.

FIGS. 1, 1A, 1B show schematic cross-sectional views of various inventive multilayer films 1 of the present invention according to particular embodiments. Especially, FIGS. 1, 1A, 1B schematize cross-sections of inventive multilayer films 1, especially thermoplastic multilayer films, particularly to be used for food packaging.

FIG. 1 schematizes a cross-section of an inventive multilayer film 1, especially a thermoplastic multilayer film, particularly to be used for food packaging, wherein the multilayer film 1 comprises at least three layers and/or layer composites 2, 3, 4; 2a, 2b, 2c; 3a, 3b, 3c, especially at least three polymeric layers and/or layer composites, namely: (A) an inner layer composite 2, especially an inner food contacting layer composite, wherein the inner layer composite 2 comprises a plurality of single inner layers 2a, 2b, 2c attached and/or adhered to one another, especially coextruded to one another, wherein the single inner layers 2a, 2b, 2c are each composed of at least one foamed polymer comprising at least one polyolefin and wherein the single inner layers 2a, 2b, 2c each comprise a multitude of voids, especially open cells or pores, capable of reversibly retaining and/or absorbing at least one food additive; (B) an outer layer composite 3, wherein the outer layer composite 3 comprises a plurality of single outer layers 3a, 3b, 3c attached and/or adhered to one another, especially coextruded to one another, wherein the single outer layers 3a, 3b, 3c each comprise at least one polyamide; (C) an adhesive layer (tie layer) 4 disposed between the inner layer composite 2 and the outer layer composite 3, especially adhered to and/or coextruded with the inner layer composite 2 and the outer layer composite 3. The specific embodiment shown in FIG. 1 refers to an inventive multilayer film 1 comprising: an outer layer composite 3 comprising three single outer layers 3a, 3b, 3c; an adhesive layer (tie layer) 4 disposed between the outer layer composite 3 and the inner layer composite 2; and an inner layer composite 2 comprising three single inner layers 2a, 2b, 2c.

FIG. 1A schematizes a cross-section of an inventive multilayer film 1, especially a thermoplastic multilayer film, particularly to be used for food packaging, according to another particular embodiment. The specific embodiment shown in FIG. 1A refers to an inventive multilayer film 1 comprising: an outer layer composite 3 comprising two single outer layers 3a, 3b attached and/or adhered to one another, especially coextruded to one another, wherein the single outer layers 3a, 3b each comprise at least one polyamide; an adhesive layer (tie layer) 4 (which is disposed between the outer layer composite 3 and the inner layer composite 2); and, finally, an inner layer composite 2, especially an inner food contacting layer composite, comprising four single inner layers 2a, 2b, 2c, 2d attached and/or adhered to one another, especially coextruded to one another, with each of the single inner layers 2a, 2b, 2c, 2d being composed of at least one foamed polymer comprising at least one polyolefin and with each of the single inner layers 2a, 2b, 2c, 2d comprising a multitude of voids, especially open cells or pores, capable of reversibly retaining and/or absorbing at least one food additive; wherein all layers 2a, 2b, 2c, 2d, 3a, 3b, 4 and/or all layer composites 2, 3, respectively, are coextruded and/or are adhered to one another.

FIG. 1B schematizes a cross-section of an inventive multilayer film 1, especially a thermoplastic multilayer film, particularly to be used for food packaging, according to yet another particular embodiment. According to this particular embodiment, the inventive multilayer film 1 furthermore comprises at least one additional layer 4a disposed between the inner layer composite 2 and the adhesive layer 4, especially adhered to and/or coextruded with the inner layer composite 2 and the adhesive layer 4 via its opposite sides. Preferably, the additional layer 4a may be a continuous layer, especially a uniform and/or homogeneous and/or uninterrupted and/or non-foamed layer, particularly without any voids. As explained hereinbefore, this particular embodiment provides the additional advantages that, on the one hand, by the presence of the additional and preferably continuous layer disposed between the inner layer composite and the adhesive layer, the adhesion is improved since a continuous layer provides a better adhesion than a foamed and non-continuous layer, and that, on the other hand, the presence of the additional and preferably continuous layer also improves the barrier properties of the inventive, especially the water vapor barrier properties. The specific embodiment shown in FIG. 1B refers to an inventive multilayer film 1 comprising: an outer layer composite 3 comprising two single outer layers 3a, 3b attached and/or adhered to one another, especially coextruded to one another, wherein the single outer layers 3a, 3b each comprise at least one polyamide; an adhesive layer (tie layer) 4 (which is disposed between the outer layer composite 3 and the additional layer 4a); an additional and preferably continuous layer 4a (which is disposed between the adhesive layer 4 and the inner layer composite 2); and, finally, an inner layer composite 2, especially an inner food contacting layer composite, comprising three single inner layers 2a, 2b, 2c attached and/or adhered to one another, especially coextruded to one another, with each of the single inner layers 2a, 2b, 2c being composed of at least one foamed polymer comprising at least one polyolefin and with each of the single inner layers 2a, 2b, 2c comprising a multitude of voids, especially open cells or pores, capable of reversibly retaining and/or absorbing at least one food additive; wherein all layers 2a, 2b, 2c, 3a, 3b, 4, 4a and/or all layer composites 2, 3, respectively, are coextruded and/or are adhered to one another.

FIGS. 2A, 3A, 4A show transmitted light micrographs of the inner layer composites, especially the inner food contacting layer composites, of three different multilayer films of the present invention according to three particular embodiments, whereas FIGS. 2B, 3B, 4B show the corresponding binary images (color inverted or negatives, respectively) of the transmitted light micrographs shown in FIGS. 2A, 3A, 4A. As may be seen from these figures, the voids of the inner layer composites or the single inner layers, respectively, are open voids, especially in the form of open cells or pores. The inner layer composites or the single inner layers, respectively, are each in the form of a rigid, solidified or stiffened open-voided foam, especially having an irregularly and/or randomly web-like, net-like, meshed, reticular or honey-comb-like structure with respect to a two-dimensional projection plane of the foam. Particularly, the voids are each entirely surrounded and/or bordered by walls composed of the polymer comprising at least one polyolefin.

FIGS. 2C, 3C, 4C show the corresponding void size analysis results of the inner layer composites, especially the inner food contacting layer composites, of the three different inventive multilayer films, the transmitted light micrographs of which are shown in FIGS. 2A, 3A, 4A, whereas FIG. 5A shows the frequency distribution of the void area sizes (in $mm^2$) of different inventive multilayer films according to a particular embodiment and FIG. 5B shows the cumulative percentage-based distribution of the void area sizes (in $mm^2$) of different inventive multilayer films according to a particular embodiment.

As may be seen from these figures, the voids of the single inner layers each have absolute cross-sectional sizes, referred to a two-dimensional projection plane, in the range of from 0.001 to 10 $mm^2$, especially in the range of from 0.005 to 8 $mm^2$, preferably in the range of from 0.01 to 7 $mm^2$, determined by digital image processing of two-dimensional micrographs of the single inner layers. Particularly, 30% to 80% of the voids have absolute cross-sectional sizes below 1.0 $mm^2$, especially below 0.8 $mm^2$. Particularly, 70% to 95% of the voids have absolute cross-sectional sizes below 3 $mm^2$, especially below 1.5 $mm^2$. As also follows from these figures, the voids of the single inner layers each have average (i.e. median) cross-sectional sizes, referred to a two-dimensional projection plane, in the range of from 0.01 to 5 $mm^2$, especially in the range of from 0.05 to 2 $mm^2$, preferably in the range of from 0.1 to 1 $mm^2$, determined by digital image processing of two-dimensional micrographs of the single inner layers. Especially, the voids of the single inner layers in their totality comprise from 10% to 80%, especially from 20% to 70%, preferably from 30% to 60%, of the surface area of the single inner layers, referred to a two-dimensional projection plane, determined by digital image processing of two-dimensional micrographs of the single inner layers.

Finally FIG. 6 shows a typical process flow diagram of an inventive manufacturing method for producing an inventive multilayer film or an inventive food packaging film, respectively, according to a particular embodiment.

According to a particular embodiment shown in FIG. 6, an inventive multilayer film may be made using a triple-bubble method, known in particular for production of oriented shrinkable sausage casings. By this method a multilayer primary tube may be formed by melt extruding through a multilayer annual die. It may be a multilayer (e.g. six, seven, eight etc. layer) die providing the required layer numbers and ratios. The resins or resin mixtures may be fed from hoppers into single screw extruders where the resins are heat plasticized and extruded through the annual die. The extrusion temperatures are set appropriately to the resins or resin mixtures used in each particular layer. A mixture of polyethylene and foaming aid is fed into two, three or more inner layers based on an available die design. The extruded tube may be cooled by water quenching in the water when passing through a calibrator of a given size. The temperature of the cooling fluid (e.g. water) is significantly below the temperature of the molten primary tube, i.e. it is crucial for creating enough amorphous areas in the polymers for further stretching. The cooling temperature is preferably within a range of from 4 to 15° C. The cooled primary tube is collapsed and pulled through the heating zone to obtain its draw temperature, which is equal or several degrees centigrade above the glass transition temperature of the polymers used in the film composition. The reheated primary tube may be radially expanded in the transverse direction (TD), e.g. using trapped air bubble between two nip rollers, and stretched in the machine direction (MD), e.g. using faster speed of the pulling nip roller. The simultaneous expansion and stretching of the tube may be accompanied by an extreme, i.e. quick reduction of thickness. This allows achieving good mechanical properties, shrinkage and glossing appearance of the final casing. Furthermore, stretching of the foamed inner layers increases the void or cell size from microns in the primary tube to millimeters. A usual range of the orientation ratios may be e.g. from 2.0 to 2.6 in transverse direction (TD) and from 3.0 to 3.5 in machine direction (MD). The extended tubing is contacted with a stream of cooling air, the temperature of which is at least several degrees centigrade below the temperature of the tubing (tube). A stream of high velocity air is blown in the same direction as the tubing moves. The collapsed and cooled tubing is refilled with air between two next nip rollers to obtain an air bubble that is placed in the annealing oven where temperature is set by means of infrared heaters or with hot air. The temperature is function of speed and tubing diameter. The film is relaxed e.g. from 10% to 20% in flat width and from 2% to 20% in longitudinal direction. Relaxation stops free shrinkage and relieves internal stresses in the film. The diameter of the tubing is controlled by adjustment of the annealing bubble length to provide stable flat width within required tolerance. The extended tubing is contacted with a stream of cooling air, the temperature of which is at least several degrees centigrade below the temperature of the tubing. The stream of high velocity air is blown in the same direction as the tubing moves. The collapsed film is wound on the core with a controlled tension. The reel of the invented film with foamed inner layer is placed on the unwinder of the apparatus for coating of an inner surface of various tubular films with color and smoke aqueous solutions. The flat film is pulled through two nip rollers between which the tubing is filled with bubble of the aqueous solution. The amount of the food additive solution which is absorbed by the film is adjusted by upper nip roller pressure and depends on the roller design. The flattened film is impregnated with a given solution of the food additive is wound on the core with controlled tension.

As further shown in FIG. 6, the inventive multilayer films according to this specific embodiment are produced on a triple-bubble line, i.e. by a method known in particular for production of oriented shrinkable sausage casings. It includes following main stages: (a) melting, mixing and homogenization of the polymers in an extruder with following extrusion of the molten plastics through annular die, then cooling of the primary tube by water quenching in the water calibrator (Important here is to cool down the plastic as soon as possible to create enough amorphous areas in polymer for further stretching. Cooling temperature is typically 4 to 10° C.); (b) preheating of the primary tube in a water bath to obtain glass transition temperature for the orientation (Water temperature is 75 to 85° C.); (c) biaxial orientation or stretching of the polymer film is required to achieve good mechanical properties, thickness, shrinkage, gloss etc.

(Stretch factor in MD is 2.0 to 2.6 and in TD 3.0 to 3.5.); (d) annealing (It is controlled relaxation to relieve internal stresses from the film.); (e) winding on the cores. Typically, the produced inventive multilayer films are in most cases 7-layer films (i.e. two outer PA layers, one adhesive layer and three void-containing inner PE layers). Particularly, it is preferred to produce such foamed inner structure as an at least 3-layer structure.

The outer layers may comprise polyamides (e.g. polyamide 6 and/or polyamide 6.66 and/or other copolyamides or aromatic polyamides or mixtures thereof). They may optionally contain 5% to 10% amorphous copolyamide (e.g. PA 6I/6T) as a processing aid. It is preferred that the minimum overall thickness of all outer layers should be about 50% of total film thickness since this is advantageous as to the extrusion process stability (i.e. bubble breaks, size stability etc.) and as to sufficient mechanical and barrier properties of the casing.

The adhesive intermediate layer may comprise maleic anhydride grafted polyethylene. It is preferred that the layer thickness should be 5% to 10% of the film thickness to provide sufficient interlayer adhesion.

The foamed inner layer composite is based on polyolefins (e.g. low density polyethylenes, in particular in a blend with 1% to 10% of a chemical foaming agent). It is preferred to obtain relatively high thickness of this inner layer composite in order to provide sufficient depth of the voids, especially cells and pores, and thus of their volume. The inner layer composite is composed of at least two, preferably at least three thinner single layers, which provide an overlaying of the foamed layers pattern, thus creating more sophisticated cellular structure capable to hold larger amount of preferably aqueous solutions of food additives, probably due to capillary effects (without being bound to this theory).

In FIG. 6, reference signs 5a, 5b and 5c designate the first bubble, the second bubble and the third bubble, respectively, whereas reference sign 6 designates the plurality of extruders, reference sign 7 the calibration and water quench and reference sign 8 the film blowing head. In FIG. 6, the heating bath 9 is followed by an orientation unit (stretching unit) 10, a width measuring device 11 and a thermofixation unit 13, followed by cooling via a cooling ring 14 fed with cold air by a cold air blower 12. The produced inventive multilayer film is then wound up to rolls via a winder 15.

Further configurations, adaptations, variations, modifications, peculiarities, particularities and advantages of the present invention are immediately apparent to and implementable by the person skilled in the art on reading or studying the present application, without leaving the realm of the present invention.

The present invention will be illustrated, in the following, by the various examples which will described hereinbelow but which are not at all intended to restrict the present invention in any way.

EXAMPLES

General Description of the Manufacturing Method for the Inventive Examples

All inventive and comparative films are produced in a production unit in shown in FIG. 6 and according to a manufacturing method as described above.

All inventive thermoplastic multilayer films produced comprise (A) an inner layer composite, i.e. an inner food contacting layer composite, comprising a plurality of single inner layers (usually 2-4 single inner layers) attached to one another and each being composed of at least one foamed polymer comprising at least one polyolefin, (B) an outer layer composite comprising a plurality of single outer layers (usually 2 single outer layers) attached to one another and each comprising at least one polyamide, and, finally, (C) an adhesive layer (tie layer) disposed between the inner layer composite, on the one hand, and the outer layer composite, on the other hand.

All inventive and comparative multilayer films are produced by a coextrusion method as described hereinbefore, using an annular ring die comprising a plurality of ring-like channels, with each channel being assigned to a single layer of the resulting multilayer film.

All multilayer films produced have overall thicknesses in the range of from 75 to 300 µm, with the inner single layers ranging of from 7.5 to 25 µm each and the outer single layers ranging from 5 to 50 µm each, however, with the proviso that the outer layer composite composed of the various single outer layers constitutes at least 50% of the overall film thickness and the inner layer composite composed of the various single inner layers constitutes at least 25% of the overall film whereas the adhesive layer ranges of from 3 to 20 micrometers in thickness and usually comprises from 5% to 15% of the overall film thickness.

All inventive multilayer films produced have the following structure (from inside to outside): (A) food contacting inner layer composite (composed of 2 or more single foamed porous inner PE containing layers)/(C) adhesive layer (composed of 1 layer)/(B) outer layer composite (composed of 2 or more single outer PA containing layers).

The polyolefin used for the foamed inner single layers is especially LLDPE (e.g. DOWLEX™ 2740 G of Dow Chemical Company), especially with a density of about 0.940 g/cm$^3$ (ASTM D792). Prior to coextrusion, this polyolefin is mixed with 3 wt. % to 10 wt. % of a chemical foaming agent (CFA), preferably on the basis of a carbonate or bicarbonate with citric acid (e.g. Hydrocerol® 591 of Clariant International, Ltd.).

The polyamide used for the outer single layers is especially a polyamide 6.66 copolymer (e.g. UBE 5033 FDX57 UBE Engineering Plastics S.A.) and/or a polyamide 6 (e.g. Akulon® F136-C1 of DSM Engineering Plastics or UBE 1030B of UBE Engineering Plastics S.A.), optionally blended with a partially aromatic polyamide such as polyamide 6I/6T (e.g. Grivory® G-21 of EMS Grivory).

The adhesive used for the intermediate adhesive single layer is especially an elastomeric or thermoplastic polyethylene, especially a rubber-modified and/or maleic anhydride grafted polyethylene (e.g. Admer® AT1955A from Mitsui Chemicals America, Ltd.).

Impregnation and/or coating of the inner sides of all inventive and comparative multilayer films with a food additive such as caramel or liquid smoke, is performed as described, by slugging, as is well known in the art.

All properties, parameters etc. indicated for the obtained films are determined by usual and well-known methods, especially with standardized methods as indicated hereinabove for the various parameters.

A schematic cross-sectional view of the inventive thermoplastic multilayers produced in the examples is given in FIG. 1, whereas FIGS. 2A, 3A and 4A show microscopic views of the inner food contacting layers of various inventive multilayer films.

The results obtained are discussed in the following; especially, the relevant results obtained with respect to the various films produced are indicated in the respective tables given below.

Examples of Series A

Three inventive multilayer films (Films No. A1, A2 and A3) with the following film structure are produced: (A) food contacting inner foamed porous layer composite (composed of 4 foamed porous single inner PE containing layers)/(C) adhesive layer (composed of 1 layer)/(B) outer layer composite (composed of 2 single outer PA containing layers). The properties are indicated in Table 1.

Loading with food additive (aqueous caramel solution or liquid smoke) via slugging impregnation method leads to absorption of from 61 wt. % to 77 wt. % of the food additive, based on the multilayer film dry weight. Comparative films comprising one single inner foamed porous layer of same overall thickness have only a reduced loading capacity; further comparative films based on cellulose also provide only 50 wt. % to 70 wt. % loading of food additive.

TABLE 1

| Parameter | | UNITS | Film No. A1 | Film No. A2 | Film No. A3 |
|---|---|---|---|---|---|
| Thickness | AVG | micron | 218 | 189 | 177 |
| | Max | | 293 | 221 | 292 |
| | Min | | 128 | 165 | 113 |
| Tensile strength | MD | MPa | 39.2 | 35.9 | 36.1 |
| | TD | | 38.7 | 45.7 | 52.2 |
| Elongation | MD | % | 149 | 123 | 83 |
| | TD | | 95 | 86 | 94 |
| Modulus, from tensile curve | MD | MPa | 271.30 | 286.80 | 309.80 |
| | TD | | 284.30 | 316.10 | 331.00 |
| Shrink at 90° C. | MD | % | 24 | 20 | 21 |
| | TD | | 22 | 20 | 23 |
| Oxygen Transmission Rate | 2-day | cc/m a | n.d. | n.d. | 78.0 |
| | | b | n.d. | n.d. | 52.2 |
| Moisture Vapor Transmission Rate | 2-day | gm/m a | 262.8 | 135.6 | 226.4 |
| | | b | 322.2 | 162.2 | 180.6 |
| Dynamic puncture | | CM/kg | 4.00 | 3.83 | n.d. |
| Water absorption lab test | | % | 38.1 | 48.0 | 16.0 |
| | | g/m² | 22.7 | 25.8 | 11.9 |

TABLE 1-continued

| Parameter | UNITS | Film No. A1 | Film No. A2 | Film No. A3 |
|---|---|---|---|---|
| Water absorption | % | 55.5 | 77.5 | 61.3 |
| Industrial test | g/m² | 33.1 | 46.2 | 36.5 |

AVG = average
n.d. = not determined

Examples of Series B

Five inventive multilayer films (Films No. B1 to B5) with the following film structure are produced: (A) food contacting inner foamed porous layer composite (composed of 4 foamed porous single inner PE containing layers)/(C) adhesive layer (composed of 1 layer)/(B) outer layer composite (composed of 2 single outer PA containing layers). Loading with food additive (aqueous caramel solution) via slugging impregnation method leads to absorption of from 52 wt. % to 104 wt. % of the food additive, based on the multilayer film dry weight. The properties are indicated in Table 2.

TABLE 2

| Film No. | B1 | B2 | B3 | B4 | B5 |
|---|---|---|---|---|---|
| Weight after slugging | 14.2 | 17.1 | 62.7 | 65.9 | 52.9 |
| Weight before slugging | 9.3 | 11 | 30.8 | 35.1 | 29.8 |
| % Weight Gain Solution food additive | 52.69% | 55.45% | 103.57% | 87.75% | 77.52% |
| | | Aqueous Caramel Solution | | | |

Examples of Series C

Various other inventive and comparative multilayer films are produced, which may also be loaded with a food additive (e.g. aqueous caramel solution or liquid smoke) via slugging impregnation method The results obtained are indicated in the respective Tables 3A to 3L (wherein layer thicknesses are indicated in micrometers, densities are indicated in g/cm³ and all percentages are weight-based unless not explicitly indicated to the contrary and wherein the abbreviation AVG denotes average).

TABLE 3A

Multilayer film with 7 layers

| Extruder | Layer Name | % of film | Material type | Material grade | % in Layer | Layer thickness | % wt. in film | Density |
|---|---|---|---|---|---|---|---|---|
| A | Outer | 26.00% | PA 6.66 | UBE 5033FDX57 | 100.00% | 15.08 | 26.00% | 1.130 |
| B | Outer Core | 26.00% | PA 6.66 | UBE 5033FDX57 | 100.00% | 15.08 | 26.00% | 1.130 |
| C | Adhesive | 10.00% | Adhesive | Admer AT1955A | 100.00% | 5.80 | 10.00% | 0.890 |
| D | Inner Core | 11.00% | LLDPE | DOWLEX 2045G | 96.00% | 6.38 | 10.56% | 0.920 |
| | | | CFA | Hydrocerol 591 | 4.00% | | 0.44% | 0.612 |
| E | Inner Core | 10.00% | LLDPE | DOWLEX 2045G | 96.00% | 5.80 | 9.60% | 0.920 |
| | | | CFA | Hydrocerol 591 | 4.00% | | 0.40% | 0.612 |
| F | Inner Barrier | 5.00% | LLDPE | DOWLEX 2045G | 96.00% | 2.90 | 4.80% | 0.920 |
| | | | CFA | Hydrocerol 591 | 4.00% | | 0.20% | 0.612 |
| G | Inner | 12.00% | LLDPE | DOWLEX 2045G | 96.00% | 6.96 | 11.52% | 0.920 |
| | | | CFA | Hydrocerol 591 | 4.00% | | 0.48% | 0.612 |
| | | | | | | AVG Density of Film | | 1.02152 |

TABLE 3B

Multilayer film with 7 layers

| Extruder | Layer Name | % of film | Material type | Material grade | % in Layer | Layer thickness | % wt. in film | Density |
|---|---|---|---|---|---|---|---|---|
| A | Outer | 26.00% | PA 6.66 | UBE 5033FDX57 | 100.00% | 15.08 | 26.00% | 1.130 |
| B | Outer Core | 26.00% | PA 6.66 | UBE 5033FDX57 | 100.00% | 15.08 | 26.00% | 1.130 |
| C | Adhesive | 10.00% | Adhesive | Admer AT1955A | 100.00% | 5.80 | 10.00% | 0.890 |
| D | Inner Core | 11.00% | LLDPE | DOWLEX 2740G | 96.00% | 6.38 | 10.56% | 0.940 |
|   |   |   | CFA | Hydrocerol 591 | 4.00% |   | 0.44% | 0.612 |
| E | Inner Core | 10.00% | LLDPE | DOWLEX 2740G | 96.00% | 5.80 | 9.60% | 0.940 |
|   |   |   | CFA | Hydrocerol 591 | 4.00% |   | 0.40% | 0.612 |
| F | Inner Barrier | 5.00% | LLDPE | DOWLEX 2740G | 96.00% | 2.90 | 4.80% | 0.940 |
|   |   |   | CFA | Hydrocerol 591 | 4.00% |   | 0.20% | 0.612 |
| G | Inner | 12.00% | LLDPE | DOWLEX 2740G | 96.00% | 6.96 | 11.52% | 0.940 |
|   |   |   | CFA | Hydrocerol 591 | 4.00% |   | 0.48% | 0.612 |
|   |   |   |   |   |   | AVG Density of Film |   | 1.02881 |

TABLE 3C

Multilayer film with 7 layers

| Extruder | Layer Name | % of film | Material type | Material grade | % in Layer | Layer thickness | % wt. in film | Density |
|---|---|---|---|---|---|---|---|---|
| A | Outer | 26.00% | PA 6.66 | UBE 5033FDX57 | 100.00% | 15.08 | 26.00% | 1.130 |
| B | Outer Core | 26.00% | PA 6.66 | UBE 5033FDX57 | 100.00% | 15.08 | 26.00% | 1.130 |
| C | Adhesive | 10.00% | Adhesive | Admer NF518 | 100.00% | 5.80 | 10.00% | 0.910 |
| D | Inner Core | 11.00% | LLDPE | DOWLEX 2740G | 96.00% | 6.38 | 10.56% | 0.940 |
|   |   |   | CFA | Hydrocerol 591 | 4.00% |   | 0.44% | 0.612 |
| E | Inner Core | 10.00% | LLDPE | DOWLEX 2740G | 96.00% | 5.80 | 9.60% | 0.940 |
|   |   |   | CFA | Hydrocerol 591 | 4.00% |   | 0.46% | 0.612 |
| F | Inner Barrier | 5.00% | LLDPE | DOWLEX 2740G | 96.00% | 2.90 | 4.80% | 0.940 |
|   |   |   | CFA | Hydrocerol 591 | 4.00% |   | 0.20% | 0.612 |
| G | Inner | 12.00% | LLDPE | DOWLEX 2740G | 96.00% | 6.96 | 11.52% | 0.940 |
|   |   |   | CFA | Hydrocerol 591 | 4.00% |   | 0.48% | 0.612 |
|   |   |   |   |   |   | AVG Density of Film |   | 1.03081 |

TABLE 3D

Multilayer film with 5 layers (comparative)

| Layer | % of film | Material type | Material grade | % in Layer | Layer thickness | %wt. in film | Density |
|---|---|---|---|---|---|---|---|
| Outer | 55.00% | PA 6.66 | UBE 5033FDX57 | 50.00% | 31.90 | 27.50% | 1.130 |
|   |   | PA 6 | Akulon F136-C1/UBE 1030B | 50.00% |   | 27.50% | 1.140 |
| Adhesive | 5.00% | Adhesive | Admer AT1955A | 100.00% | 2.90 | 5.00% | 0.890 |
| Core | 20.00% | LLDPE | DOWLEX 2045G | 96.00% | 11.60 | 19.20% | 0.920 |
|   |   | CFA | Hydrocerol 591 | 4.00% |   | 0.80% | 0.612 |
| Adhesive | 5.00% | LLDPE | DOWLEX 2045G | 96.00% | 2.90 | 4.80% | 0.920 |
|   |   | CFA | Hydrocerol 591 | 4.00% |   | 0.20% | 0.612 |
| Inner | 15.00% | LLDPE | DOWLEX 2045G | 96.00% | 8.70 | 14.40% | 0.920 |
|   |   | CFA | Hydrocerol 591 | 4.00% |   | 0.60% | 0.612 |
|   |   |   | Total |   |   | 100.00% |   |
|   |   |   | AVG Density of Film |   |   |   | 1.03182 |

TABLE 3E

Multilayer film with 5 layers (comparative)

| Layer | % of film | Material type | Material grade | % in Layer | Layer thickness | % wt. in film | Density |
|---|---|---|---|---|---|---|---|
| Outer | 55.00% | PA 6.66 | UBE 5033FDX57 | 50.00% | 31.90 | 27.50% | 1.130 |
|  |  | PA 6 | Akulon F136-C1/UBE 1030B | 50.00% |  | 27.50% | 1.140 |
| Adhesive | 5.00% | Adhesive | AT1955A | 100.00% | 2.90 | 5.00% | 0.890 |
| Core | 20.00% | LLDPE | DOWLEX 2740G | 96.00% | 11.60 | 19.20% | 0.940 |
|  |  | CFA | Hydrocerol 591 | 4.00% |  | 0.80% | 0.612 |
| Adhesive | 5.00% | LLDPE | DOWLEX 2740G | 96.00% | 2.90 | 4.80% | 0.940 |
|  |  | CFA | Hydrocerol 591 | 4.00% |  | 0.20% | 0.612 |
| Inner | 15.00% | LLDPE | DOWLEX 2740G | 96.00% | 8.70 | 14.40% | 0.946 |
|  |  | CFA | Hydrocerol 591 | 4.00% |  | 0.60% | 0.612 |
|  |  |  |  |  | Total | 100.00% |  |
|  |  |  |  |  | AVG Density of Film |  | 1.03950 |

TABLE 3F

Multilayer film with 7 layers

| Extruder | Layer Name | % of film | Material type | Material grade | % in Layer | Layer thickness | % wt. in film | Density |
|---|---|---|---|---|---|---|---|---|
| A | Outer | 26.00% | PA 6.66 | UBE 5033FDX57 | 100.00% | 15.08 | 26.00% | 1.130 |
| B | Outer Core | 26.06% | PA 6.66 | UBE 5033FDX57 | 100.00% | 15.08 | 26.00% | 1.130 |
| C | Adhesive | 10.60% | Adhesive | Admer NF518 | 100.00% | 5.80 | 10.00% | 0.910 |
| D | Inner Core | 11.00% | LLDPE | DOWLEX 2045G | 96.00% | 6.38 | 10.56% | 0.920 |
|  |  |  | CFA | Hydrocerol 591 | 4.00% |  | 0.44% | 0.612 |
| E | Inner Core | 10.00% | LLDPE | DOWLEX 2045G | 96.00% | 5.80 | 9.60% | 0.920 |
|  |  |  | CFA | Hydrocerol 591 | 4.00% |  | 0.40% | 0.612 |
| F | Inner Barrier | 5.00% | LLDPE | DOWLEX 204SG | 96.00% | 2.90 | 4.80% | 0.920 |
|  |  |  | CFA | Hydrocerol 591 | 4.00% |  | 0.20% | 0.612 |
| G | Inner | 12.00% | LLDPE | DOWLEX 2045G | 96.00% | 6.96 | 11.52% | 0.920 |
|  |  |  | CFA | Hydrocerol 591 | 4.00% |  | 0.48% | 0.612 |
|  |  |  |  |  |  | AVG Density of Film |  | 1.02352 |

TABLE 3G

Multilayer film with 5 layers (comparative)

| Layer | % of film | Material type | Material grade | % in Layer | Layer thickness | % wt. in film | Density |
|---|---|---|---|---|---|---|---|
| Outer | 55.00% | PA 6.66 | UBE 5033FDX57 | 50.00% | 31.90 | 27.50% | 1.130 |
|  |  | PA 6 | Akulon F136-C1/UBE 1030B | 50.00% |  | 27.50% | 1.140 |
| Adhesive | 5.00% | Adhesive | Admer NF518E | 100.00% | 2.90 | 5.00% | 0.910 |
| Core | 20.00% | LLDPE | DOWLEX 2740G | 96.00% | 11.60 | 19.20% | 0.940 |
|  |  | CFA | Hydrocerol 591 | 4.00% |  | 0.80% | 0.612 |
| Adhesive | 5.00% | LLDPE | DOWLEX 2740G | 96.00% | 2.90 | 4.80% | 0.940 |
|  |  | CFA | Hydrocerol 591 | 4.00% |  | 0.20% | 0.612 |
| Inner | 15.00% | LLDPE | DOWLEX 2740G | 96.00% | 8.70 | 14.40% | 0.940 |
|  |  | CFA | Hydrocerol 591 | 4.00% |  | 0.60% | 0.612 |
|  |  |  |  |  | Total | 100.00% |  |
|  |  |  |  |  | AVG Density of Film |  | 1.04050 |

TABLE 3H

Multilayer film with 5 layers (comparative)

| Layer | % of film | Material type | Material grade | % in Layer | Layer thickness | % wt in film | Density |
|---|---|---|---|---|---|---|---|
| Outer | 55.00% | PA 6.66 | UBE 5033FDX57 | 50.00% | 31.90 | 27.50% | 1.130 |
| | | PA 6 | Akulon F136-C1/UBE 1030B | 50.00% | | 27.50% | 1.140 |
| Adhesive | 5.00% | Adhesive | Admer NF518E | 100.00% | 2.90 | 5.00% | 0.910 |
| Core | 20.00% | LLDPE | DOWLEX 2045G | 96.00% | 11.60 | 19.20% | 0.920 |
| | | CFA | Hydrocerol 591 | 4.00% | | 0.80% | 0.612 |
| Adhesive | 5.00% | LLDPE | DOWLEX 2045G | 96.00% | 2.90 | 4.80% | 0.920 |
| | | CFA | Hydrocerol 591 | 4.00% | | 0.20% | 0.612 |
| Inner | 15.00% | LLDPE | DOWLEX 2045G | 96.00% | 8.70 | 14.40% | 0.920 |
| | | CFA | Hydrocerol 591 | 4.00% | | 0.60% | 0.612 |
| | | | | | Total | 100.00% | |
| | | | | | AVG Density of Film | | 1.03282 |

TABLE 3I

Multilayer film with 5 layers (comparative)

| Layer | % of film | Material type | Material grade | % in Layer | Layer thickness | % wt. in film | Density |
|---|---|---|---|---|---|---|---|
| Outer | 55.00% | PA 6.66 | UBE Akulon F136-C1/UBE 1030B | 95.00% | 31.90 | 52.25% | 1.140 |
| | | PA 6 | Grivory G-21 | 5.00% | | 2.75% | 1.180 |
| Adhesive | 5.00% | Adhesive | Admer AT1955 A | 100.00% | 2.90 | 5.00% | 0.890 |
| Core | 20.00% | LLDPE | DOWLEX 2045G | 96.00% | 11.60 | 19.20% | 0.920 |
| | | CFA | Hydrocerol 591 | 4.00% | | 0.80% | 0.612 |
| Adhesive | 5.00% | LLDPE | DOWLEX 2045G | 96.00% | 2.90 | 4.80% | 0.920 |
| | | CFA | Hydrocerol 591 | 4.00% | | 0.20% | 0.612 |
| Inner | 15.00% | LLDPE | DOWLEX 2045G | 96.00% | 8.70 | 14.40% | 0.920 |
| | | CFA | Hydrocerol 591 | 4.00% | | 0.60% | 0.612 |
| | | | | | Total | 100% | |
| | | | | | AVG Density of Film | | 1.03567 |

TABLE 3J

Multilayer film with 5 layers (comparative)

| Layer | % of film | Material type | Material grade | % in Layer | Layer thickness | % wt. in film | Density |
|---|---|---|---|---|---|---|---|
| Outer | 55.00% | PA 6.66 | UBE Akulon F136-C1/UBE 1030B | 95.00% | 31.90 | 52.25% | 1.140 |
| | | PA 6 | Grivory G-21 | 5.00% | | 2.75% | 1.180 |
| Adhesive | 5.00% | Adhesive | Admer AT1955 A | 100.00% | 2.90 | 5.00% | 0.890 |
| Core | 20.00% | LLDPE | DOWLEX 2740G | 96.00% | 11.60 | 19.20% | 0.940 |
| | | CFA | Hydrocerol 591 | 4.00% | | 0.80% | 0.612 |
| Adhesive | 5.00% | LLDPE | DOWLEX 2740G | 96.00% | 2.90 | 4.80% | 0.940 |
| | | CFA | Hydrocerol 591 | 4.00% | | 0.20% | 0.612 |
| Inner | 15.00% | LLDPE | DOWLEX 2740G | 96.00% | 8.70 | 14.40% | 0.940 |
| | | CFA | Hydrocerol 591 | 4.00% | | 0.60% | 0.612 |
| | | | | | Total | 100% | |
| | | | | | AVG Density of Film | | 1.04335 |

TABLE 3K

Multilayer film with 5 layers (comparative)

| Layer | % of film | Material type | Material grade | % in Layer | Layer thickness | % wt. in film | Density |
|---|---|---|---|---|---|---|---|
| Outer | 55.00% | PA 6.66 | UBE Akulon F136-C1/UBE 1030B | 95.00% | 31.90 | 52.25% | 1.140 |
|  |  | PA 6 | Grivory G-21 | 5.00% |  | 2.75% | 1.180 |
| Adhesive | 5.00% | Adhesive | Admer NF518E | 100.00% | 2.90 | 5.00% | 0.910 |
| Core | 20.00% | LLDPE | DOWLEX 2740G | 96.00% | 11.60 | 19.20% | 0.940 |
|  |  | CFA | Hydrocerol 591 | 4.00% |  | 0.80% | 0.612 |
| Adhesive | 5.00% | LLDPE | DOWLEX 2740G | 96.00% | 2.90 | 4.80% | 0.940 |
|  |  | CFA | Hydrocerol 591 | 4.00% |  | 0.20% | 0.612 |
| Inner | 15.00% | LLDPE | DOWLEX 2740G | 96.00% | 8.70 | 14.40% | 0.940 |
|  |  | CFA | Hydrocerol 591 | 4.00% |  | 0.60% | 0.612 |
|  |  |  |  | Total |  | 100% |  |
|  |  |  |  | AVG Density of Film |  |  | 1.04435 |

TABLE 3L

Multilayer film with 5 layers (comparative)

| Layer | % of film | Material type | Material grade | % in Layer | Layer thickness | % wt. in Film | Density |
|---|---|---|---|---|---|---|---|
| Outer | 55.00% | PA 6.66 | UBE Akulon F136-C1/UBE 1030B | 95.00% | 31.90 | 52.25% | 1.140 |
|  |  | PA 6 | Grivory G-21 | 5.00% |  | 2.75% | 1.180 |
| Adhesive | 5.00% | Adhesive | Admer NF518E | 100.00% | 2.90 | 5.00% | 0.910 |
| Core | 20.00% | LLDPE | DOWLEX 2045G | 96.00% | 11.60 | 19.20% | 0.920 |
|  |  | CFA | Hydrocerol 591 | 4.00% |  | 0.80% | 0.612 |
| Adhesive | 5.00% | LLDPE | DOWLEX 2045G | 96.00% | 2.90 | 4.80% | 0.920 |
|  |  | CFA | Hydrocerol 591 | 4.00% |  | 0.20% | 0.612 |
| Inner | 15.00% | LLDPE | DOWLEX 2045G | 96.00% | 8.70 | 14.40% | 0.920 |
|  |  | CFA | Hydrocerol 591 | 4.00% |  | 0.60% | 0.612 |
|  |  |  |  | Total |  | 100% |  |
|  |  |  |  | AVG Density of Film |  |  | 1.03667 |

Examples of Series D

Another inventive and comparative multilayer film with the following film structure are produced (see Tables 4A and 4B).

TABLE 4A 7-layer structure (inventive)

| 26% | PA outer |
| 26% | PA outer |
| 10% | Tie/adhesive intermediate |
| 11% | PE + CFA inner |
| 10% | PE + CFA inner |
| 5% | PE + CFA inner |
| 12% | PE + CFA inner |

TABLE 4B 5-layer structure (comparative)

| 55% | PA outer |
| 5% | tie/adhesive intermediate |
| 20% | PE + CFA inner |
| 5% | PE + CFA inner |
| 15% | PE + CFA inner |

TABLE 4C 7-layer structure (inventive)

| 25% | PA outer |
| 25% | PA outer |
| 10% | Tie/adhesive intermediate |
| 15% | PE additional continuous layer |
| 10% | PE + CFA inner |
| 5% | PE + CFA inner |
| 10% | PE + CFA inner |

Examples of Series E

Two inventive multilayer films (Films No. E1 and E2) with the following film structure are produced: (A) food contacting inner foamed porous layer composite (composed of 3 foamed porous single inner PE containing layers)/(C) adhesive layer (composed of 1 layer)/(B) outer layer composite (composed of 2 single outer PA containing layers). Loading with water leads to good absorption. The properties are indicated in Table 5.

TABLE 5

| | Area (in²) | Initial Mass (g) | Final Mass (g) | Water Absorption wt. % gain | Water Absorption mg/100 in² |
|---|---|---|---|---|---|
| Film E1 | 15.50 | 0.5960 | 0.8230 | 38.1% | 1464.51 |
| Film E2 | 15.50 | 0.5385 | 0.7969 | 48.0% | 1667.09 |

Examples of Series F

Five further inventive multilayer films (Films No. F1 and F5) with the following film structure are produced: (A) food contacting inner foamed porous layer composite (composed of 3 foamed porous single inner PE containing layers)/(C) adhesive layer (composed of 1 layer)/(B) outer layer composite (composed of 2 single outer PA containing layers). Loading with food additive (aqueous caramel solution) via slugging impregnation method leads to good absorption of the food additive The properties are indicated in Table 6.

TABLE 6

| Film No. | F1 | F2 | F3 | F4 | F5 |
|---|---|---|---|---|---|
| Weight after slugging | 26 | 36.25 | 26.90 | 31.90 | 35.75 |
| Weight before slugging | 21.20 | 23.80 | 21.60 | 21.55 | 24.15 |
| % Weight Gain (Food additive solution) | 22.64 | 52.31 | 24.53 | 48.02 | 48.03 |

LIST OF REFERENCE SIGNS

1 multilayer film, especially multilayer thermoplastic film
2 inner layer composite
2a, 2b, 2c, 2d single (inner) layers of the inner layer composite
3 outer layer composite
3a, 3b, 3c single (outer) layers of the outer layer composite
4 adhesive layer (=tie layer)
4a additional, preferably continuous layer
5a, 5b, 5c first bubble, second bubble, third bubble
6 plurality of extruders
7 calibration and water quench
8 film blowing head
9 heating bath
10 orientation unit (stretching unit)
11 width measuring device
12 cold air blower
13 thermofixation unit
14 cooling ring
15 winder

The invention claimed is:

1. A thermoplastic multilayer film to be used for food packaging, wherein the multilayer film comprises at least three polymeric layers and/or layer composites:
   (A) an inner layer composite, which inner layer composite is an inner food contacting layer composite, wherein the inner layer composite comprises a plurality of single inner layers attached and/or adhered to one another, wherein the single inner layers are each composed of at least one foamed polymer comprising at least one polyolefin and wherein the single inner layers each comprise a multitude of voids selected among open cells and pores and being capable of reversibly retaining and/or absorbing at least one food additive;
   wherein the inner layer composite comprises at least three single inner layers, wherein the various single inner layers, same or different and independently from one another, each comprise at least one polyolefinic polymer, copolymer, or terpolymer;
   (B) an outer layer composite, wherein the outer layer composite comprises a plurality of single outer layers attached and/or adhered to one another, wherein the single outer layers each comprise at least one polyamide;
   (C) an adhesive layer in the form of a tie layer disposed between the inner layer composite and the outer layer composite and adhered to the inner layer composite and the outer layer composite;
   wherein the thickness ratio [outer layer composite: inner layer composite:adhesive layer] is [55-75:25-45:1-10];
   wherein the multilayer film has a relative volume-based porosity, based on the overall volume of the multilayer film, in the range of from 15 to 70 Vol.-%, wherein the porosity of the multilayer film is provided by the multitude of voids comprised by the single inner layers of the inner layer composite;
   wherein the multilayer film has a relative weight-based loadability or absorption capacity with the respect to the at least one food additive, based on the overall dry weight of the multilayer film, in the range of from 10 wt. % to 150 wt. %; and
   wherein the multilayer film has a water vapor transmission rate in the range of from 5 to 500 g/m²/24 hours, as determined according to ASTM F1249-06.

2. The multilayer film according to claim 1, wherein the layers and/or layer composites of the multilayer film are adhered or attached to one another by coextrusion.

3. The multilayer film according to claim 1, wherein the multilayer film has a shrinkage value (shrinkability) in the range of from 10% to 70% at a temperature of 90° C. in the longitudinal and/or transverse direction, as determined according to ASTM D2732.

4. The multilayer film according to claim 1, wherein the multilayer film has an oxygen transmission rate ($O_2$ transmission rate) in the range of from 1 to 90 cm³/m²/24 hours, at a pressure of 1 atmosphere (101.325 kPa) and at a temperature of 23° C., as determined according to ASTM D-3985-81.

5. The multilayer film according to claim 1, wherein the multilayer film has a tensile strength in the longitudinal and/or transverse direction in the range of from 15 to 100 MPa, as determined according to ASTM D-882, Method A.

6. The multilayer film according to claim 1, wherein the multilayer film has an elongation at break in the longitudinal and/or transverse direction in the range of from 20 to 300%, as determined according to ASTM D-882, Method A.

7. The multilayer film according to claim 1, wherein the multilayer film has a tensile modulus in the longitudinal and/or transverse direction in the range of from 100 to 400 MPa.

8. The multilayer film according to claim 1, wherein the inner layer composite has a thickness in the range of from 5 to 200 micrometers.

9. The multilayer film according to claim 1, wherein the outer layer composite has a thickness in the range of from 5 to 300 micrometers.

10. The multilayer film according to claim 1,
wherein the at least one food additive comprises a flavoring and/or coloring and/or odoring food additive.

11. The multilayer film according to claim 1,
wherein the at least one food additive comprises a liquid smoke or caramel.

12. The multilayer film according to claim 1,
wherein the various single inner layers, same or different and independently from one another, each comprise at least one polyolefinic polymer, copolymer or terpolymer selected from the group consisting of LDPEs, LLDPEs, VLDPEs as well as blends and copolymers and terpolymers thereof.

13. The multilayer film according to claim 1,
wherein the various single inner layers, same or different and independently from one another, each comprise at least one polyolefin having a density in the range of from 0.910 to 0.940 g/cm$^3$.

14. The multilayer film according to claim 1,
wherein the various single inner layers, same or different and independently from one another, each comprise at least 60 wt. % of at least one polyolefin, based on the overall dry weight of the respective single inner layer.

15. The multilayer film according to claim 1,
wherein the multitude of voids are generated by (co-)extrusion of the single inner layers in the presence of at least one foaming agent.

16. The multilayer film according to claim 1,
wherein the voids of the single inner layers are open voids in the form of open cells or pores.

17. The multilayer film according to claim 1,
wherein the various single outer layers, same or different and independently from one another, each comprise at least one polyamide selected from the group consisting of aliphatic, semiaromatic and aromatic polyamides as well as blends thereof.

18. The multilayer film according to claim 1,
wherein the various single outer layers, same or different and independently from one another, each comprise at least one polyamide selected from the group consisting of PA 6, PA 66, PA 6.66, PA 6.11, PA 6.12, PA 11 and PA 12 as well as blends thereof.

19. The multilayer film according to claim 1,
wherein the various single outer layers, same or different and independently from one another, each comprise at least 70 wt. % of at least one polyamide, based on the overall dry weight of the respective single outer layer.

20. The multilayer film according to claim 1,
wherein the outer layer composite comprises at least two single outer layers, which single outer layers are attached and/or adhered to one another via coextrusion and which single outer layers, independently from one another, each comprise at least one polyamide selected from the group consisting of aliphatic, semiaromatic and aromatic polyamides as well as blends thereof.

21. The multilayer film according to claim 1,
wherein the outer layer composite comprises at least two single outer layers, which single outer layers are attached and/or adhered to one another via coextrusion and which single outer layers, independently from one another, each comprise at least one polyamide selected from the group consisting of PA 6, PA 66, PA 6.66, PA 6.11, PA 6.12, PA 11 and PA 12 as well as blends thereof.

22. The multilayer film according to claim 1,
wherein the inner layer composite comprises at least four single inner layers, which single inner layers are attached and/or adhered to one another via coextrusion and which single inner layers, independently from one another, each comprise at least one polyolefinic polymer, copolymer or terpolymer selected from the group consisting of LDPEs, LLDPEs, VLDPEs as well as blends and copolymers and terpolymers thereof and having a density in the range of from 0.910 to 0.940 g/cm$^3$.

* * * * *